United States Patent
Oh et al.

(10) Patent No.: US 11,665,443 B2
(45) Date of Patent: May 30, 2023

(54) IMAGE SENSOR

(71) Applicant: SAMSUNG ELECTRONICS CO., LTD., Suwon-si (KR)

(72) Inventors: Youngsun Oh, Hwaseong-si (KR); Hyungjin Bae, Suwon-si (KR); Moosup Lim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/674,045

(22) Filed: Feb. 17, 2022

(65) Prior Publication Data

US 2022/0272289 A1 Aug. 25, 2022

(30) Foreign Application Priority Data

Feb. 22, 2021 (KR) ................ 10-2021-0023691

(51) Int. Cl.
*H04N 25/585* (2023.01)
*H04N 25/75* (2023.01)
*H04N 25/77* (2023.01)

(52) U.S. Cl.
CPC ........... *H04N 25/585* (2023.01); *H04N 25/75* (2023.01); *H04N 25/77* (2023.01)

(58) Field of Classification Search
CPC ...... H04N 25/585; H04N 25/75; H04N 25/77; H04N 25/59; H04N 25/76
See application file for complete search history.

(56) References Cited

U.S. PATENT DOCUMENTS

| | | | |
|---|---|---|---|
| 10,062,718 B2 | 8/2018 | Shishido et al. | |
| 10,110,839 B2 | 10/2018 | Mlinar et al. | |
| 10,397,500 B1 | 8/2019 | Xu et al. | |
| 10,728,475 B2 | 7/2020 | Yanagita et al. | |
| 11,350,044 B2* | 5/2022 | Mori | H04N 25/00 |
| 2018/0191973 A1* | 7/2018 | Hirota | H04N 25/622 |
| 2018/0191974 A1* | 7/2018 | Shim | H04N 25/589 |

(Continued)

OTHER PUBLICATIONS

Sakano et al., "A 132dB Single-Exposure-Dynamic-Range CMOS Image Sensor with High Temperature Tolerance", ISSCC 2020 / SESSION 5 / Imagers and ToF SENSORS / 2020 IEEE International Solid-State Circuits Conference, Feb. 2020, pp. 106-108.

*Primary Examiner* — Marly S Camargo
(74) *Attorney, Agent, or Firm* — F. Chau & Associates, LLC

(57) ABSTRACT

An image sensor including a pixel that includes: a first photodiode; a second photodiode having a larger light-receiving area than the first photodiode; a first floating diffusion node accumulating charges of the first photodiode; a second floating diffusion node accumulating charges of the second photodiode; a capacitor accumulating charges overflowing from the first photodiode; a first switch transistor having a first end connected to the first floating diffusion node and a second end connected to the capacitor; and a driving transistor configured to convert the accumulated charges into a pixel signal, the first switch transistor is turned on in a low conversion gain (LCG) mode of a readout section of the first photodiode, and is turned off in a high conversion gain (HCG) mode of the readout section of the first photodiode, and the readout circuit generates image data based on pixel signals from the first and second sections.

20 Claims, 15 Drawing Sheets

(56) References Cited

U.S. PATENT DOCUMENTS

| | | |
|---|---|---|
| 2019/0096933 A1 | 3/2019 | Kido et al. |
| 2020/0137325 A1 | 4/2020 | Mori et al. |
| 2020/0185437 A1 | 6/2020 | Koga |
| 2020/0235152 A1* | 7/2020 | Lee .................. H04N 25/53 |
| 2021/0136275 A1* | 5/2021 | Solhusvik ............ H04N 25/533 |
| 2022/0217291 A1* | 7/2022 | Kim .................. H04N 25/585 |
| 2022/0321759 A1* | 10/2022 | Miyauchi ............. H04N 25/583 |
| 2022/0394197 A1* | 12/2022 | Jung ................ H01L 27/14643 |
| 2022/0408039 A1* | 12/2022 | Park ................. H04N 25/585 |

\* cited by examiner

IMAGE SENSOR

CROSS-REFERENCE TO RELATED APPLICATION

This application claims priority under 35 U.S.C. § 119 to Korean Patent Application No. 10-2021-0023691, filed on Feb. 22, 2021, in the Korean Intellectual Property Office, the disclosure of which is incorporated by reference herein in its entirety.

TECHNICAL FIELD

The present disclosure relates to an image sensor, and more particularly, to an image sensor that generates image data using a capacitor selectively connected to a floating diffusion node.

DISCUSSION OF RELATED ART

An image sensor is a device that detects and conveys information used to make an image. For example, the image sensor captures a two-dimensional or three-dimensional image of an object. The image sensor generates an image of an object using a photoelectric conversion element, such as a photodiode, that reacts according to the intensity of light reflected from the object. Complementary Metal-Oxide Semiconductor (CMOS) image sensors are widely used in today's digital cameras and mobile phones. To increase the dynamic range of an image sensor, a capacitor may be added to a floating diffusion node.

SUMMARY

The present disclosure provides an image sensor that generates image data having a wide dynamic range and an improved signal-to-noise ratio using a capacitor selectively connected to a floating diffusion node.

According to an embodiment of the present disclosure, there is provided an image sensor including a pixel array in which a plurality of pixels are arranged and a readout circuit, wherein at least one of the plurality of pixels includes: a first photodiode; a second photodiode having a larger light-receiving area than the first photodiode; a first floating diffusion node in which charges generated by the first photodiode accumulate; a second floating diffusion node in which charges generated by the second photodiode accumulate; a first capacitor configured to accumulate charges that overflow from the first photodiode; a first switch transistor having a first end connected to the first floating diffusion node and a second end connected to the first capacitor; and a driving transistor configured to convert the charges accumulated in the first floating diffusion node and the second floating diffusion node into a pixel signal, wherein the first switch transistor is turned on in a first section operating in a low conversion gain (LCG) mode of a readout section of the first photodiode, and is turned off in a second section operating in a high conversion gain (HCG) mode of the readout section of the first photodiode, and wherein the readout circuit generates image data based on first pixel signals read out from the first section and second pixel signals read out from the second section.

According to an embodiment of the present disclosure, there is provided an image sensor including a pixel array in which a plurality of pixels are arranged and a readout circuit, wherein at least one of the plurality of pixels includes: a first photodiode; a second photodiode having a larger light-receiving area than the first photodiode; a first transmission transistor configured to transmit charges generated by the first photodiode; a second transmission transistor configured to transmit charges generated by the second photodiode; a first floating diffusion node in which charges transmitted through the first transmission transistor accumulate; a second floating diffusion node in which charges transmitted through the second transmission transistor accumulate; a gain control transistor having a first end connected to the first floating diffusion node and a second end connected to the second floating diffusion node; a first capacitor configured to accumulate charges that overflow from the first photodiode; a first switch transistor having a first end connected to the first floating diffusion node and a second end connected to the first capacitor; a reset transistor having a first end connected to the first floating diffusion node and a second end to which a reset voltage is applied; and a driving transistor configured to convert charges accumulated in the first floating diffusion node and the second floating diffusion node into a pixel signal.

According to an embodiment of the present disclosure, there is provided an image sensor including a pixel array in which a plurality of pixels are arranged and a readout circuit, wherein at least one of the plurality of pixels includes: a first photodiode; a second photodiode having a larger light-receiving area than the first photodiode; a first floating diffusion node in which charges generated by the first photodiode accumulate; a first capacitor configured to accumulate charges that overflow from the first photodiode; a first switch transistor having a first end connected to the first floating diffusion node and a second end connected to the first capacitor; a second switch transistor connected to the first floating diffusion node; a second floating diffusion node in which charges transmitted through the switch transistor accumulate; and a driving transistor configured to convert the charges accumulated in the second floating diffusion node into a pixel signal.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Figure 1:
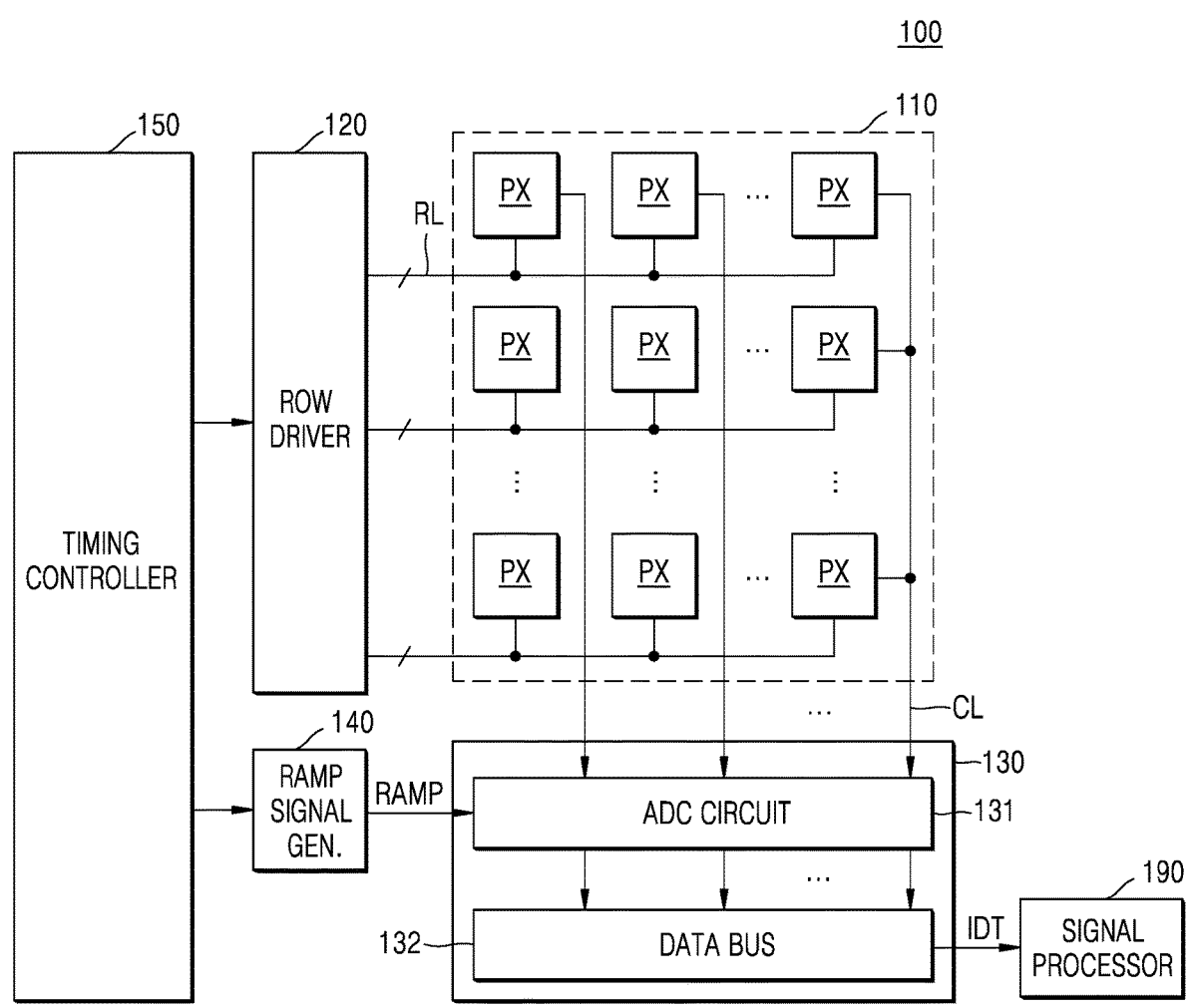
FIG. 1 is a block diagram illustrating an image sensor according to an embodiment of the present disclosure.

FIG. 1 is a block diagram illustrating an image sensor according to an embodiment of the present disclosure.

An image sensor 100 may be mounted on an electronic device having an image or light sensing function. For example, the image sensor 100 may be mounted on electronic devices such as cameras, smartphones, wearable devices, Internet of Things (IoT) devices, home appliances, tablet Personal Computers (PCs), Personal Digital Assistants (PDAs), Portable Multimedia Players (PMPs), navigation devices, drones, and Advanced Driver Assistance Systems (ADAS). In addition, the image sensor 100 may be mounted on an electronic device provided as a component for vehicles, furniture, manufacturing facilities, doors, various measuring devices, and the like.

Referring to FIG. 1, the image sensor 100 may include a pixel array 110, a row driver 120, a readout circuit 130, a ramp signal generator 140, a timing controller 150, and a signal processor 190. The readout circuit 130 may include an analog-to-digital converter circuit 131 (hereinafter referred to as an ADC circuit) and a data bus 132.

The pixel array 110 includes a plurality of row lines RL (e.g., scan lines), a plurality of column lines CL (e.g., data lines), and a plurality of pixels PX connected to the plurality of row lines RL and the plurality of column lines CL, and arranged in a matrix. The plurality of pixels PX may form an active pixel sensor (APS).

Each of the plurality of pixels PX may include at least one photoelectric conversion element, and an individual pixel PX may sense light using its photoelectric conversion element, and may output an image signal that is an electrical signal according to the sensed light. For example, the photoelectric conversion element may be a photo-sensing element made of an organic material or an inorganic material, such as inorganic photodiodes, organic photodiodes, perovskite photodiodes, phototransistors, photogates, or pinned photodiodes. In an embodiment, each of the plurality of pixels PX may include a plurality of photoelectric conversion elements.

In addition, a microlens for condensing light may be disposed above each of the plurality of pixels PX or above each pixel group composed of a plurality of adjacent pixels PX. Each of the plurality of pixels PX may detect light in a specific spectral range from light received through the microlens. For example, the pixel array 110 may include a red pixel for converting light in the red spectral range into an electrical signal, a green pixel for converting light in the green spectral range into an electrical signal, and a blue pixel for converting light in the blue spectrum region into an electrical signal. A color filter for transmitting light in a specific spectral range may be disposed above each of the plurality of pixels PX. However, the present disclosure is not limited thereto, and the pixel array 110 may include pixels that convert light in a spectral range other than red, green, and blue into electrical signals.

In an embodiment, the plurality of pixels PX may have a multi-layer structure. A multi-layered pixel PX includes a plurality of stacked photoelectric conversion elements that convert light in different spectral ranges into electrical signals, and thus, electrical signals corresponding to different colors may be generated from the plurality of photoelectric conversion elements. In other words, electrical signals corresponding to a plurality of colors may be output from one pixel PX.

A color filter array for transmitting light in a specific spectral range may be disposed on the plurality of pixels PX, and a color detectable by a corresponding pixel may be determined according to a color filter disposed on each of the plurality of pixels PX. However, the present disclosure is not limited thereto, and in an embodiment, in the case of a specific photoelectric conversion element, depending on the level of the electrical signal applied to the photoelectric conversion element, light in a specific wavelength range may be converted into an electrical signal.

In some embodiments, each of the plurality of pixels PX may include at least two photodiodes configured to be exposed to a light source. For example, the pixel PX may include a large photodiode LPD in FIG. 2 having a relatively wide light-receiving area and a small photodiode SPD in FIG. 2 having a relatively narrow light-receiving area. In other words, the light-receiving area of the large photodiode LPD may be greater than the light-receiving area of the small photodiode SPD. A structure in which the large photodiode LPD and the small photodiode SPD are included in one pixel PX may be referred to as a split photodiode structure. However, the present disclosure is not limited thereto, and the above structure may be referred to by other names.

Because the light-receiving area of the large photodiode LPD is wide, more charges may be generated by the large photodiode LPD than the small photodiode SPD under the same light-receiving conditions. In other words, the large photodiode LPD may have a higher sensitivity than the small photodiode SPD. Due to such characteristics, the large photodiode LPD may generate a pixel signal corresponding to low luminance, and the small photodiode SPD may generate a pixel signal corresponding to high luminance. Hereinafter, for convenience of description, it is assumed and described that the pixel PX includes a large photodiode LPD and a small photodiode SPD. However, the present disclosure is not limited thereto, and the pixel PX may include a plurality of photodiodes having light-receiving areas that are the same or different.

In each of the plurality of pixels PX, charges generated by photoelectric conversion elements such as photodiodes may accumulate in the floating diffusion node, and the charge accumulated in the floating diffusion node may be converted into a voltage. In this case, a rate at which charges accumulated in the floating diffusion node are converted into voltage may be referred to as a conversion gain. The conversion gain may vary according to the capacitance of the floating diffusion node.

For example, as the capacitance of the floating diffusion node increases, the conversion gain may decrease, and as the capacitance of the floating diffusion node decreases, the conversion gain may increase. In some embodiments, each of the plurality of pixels PX may operate with a dual conversion gain. The dual conversion gain includes a low conversion gain LCG and a high conversion gain HCG. Because the rate at which the charge is converted to voltage is higher than that of the low conversion gain LCG, the high conversion gain HCG may be applied to an operation of generating a pixel signal corresponding to a luminance lower than that of the low conversion gain LCG. In the following description, for convenience of description, an operation mode for generating a pixel signal using a high conversion gain HCG is referred to as a high conversion gain HCG mode or first mode, and an operation mode for generating a pixel signal using a low conversion gain LCG is referred to as a low conversion gain LCG mode or second mode.

In some embodiments, each of the large photodiode LPD and the small photodiode SPD may generate pixel signals in the dual conversion gain mode. For example, the large photodiode LPD may operate in a high conversion gain HCG mode to generate a first pixel signal corresponding to a first illumination section, which is the lowest illumination section, or may operate in a low conversion gain LCG mode to generate a second pixel signal corresponding to a second illumination section, which is a section in which an illumination is higher than that in the first illumination section. In addition, the small photodiode SPD may operate in a high conversion gain HCG mode to generate a third pixel signal corresponding to a third luminance section, which is a section in which a luminance is higher than that in the second luminance section, or may operate in a low conversion gain LCG mode to generate a fourth pixel signal corresponding to a fourth luminance section, which is the highest luminance section. In addition, the first to fourth pixel signals may be generated within one frame section in which the pixel array 110 is scanned.

The first to fourth pixel signals generated through the dual conversion gain mode of the large photodiode LPD and the small photodiode SPD may be combined into one image, and the synthesized image may have a high dynamic range. Furthermore, when the exposure time of the small photodiode SPD is increased, an LED flicker mitigation (LFM) image may be implemented. In other words, flicker may be reduced or not visible in the LFM image. To increase the exposure time of the small photodiode SPD, a high capacitance capacitor capable of accumulating a large amount of charges may be added. A detailed description of this will be given below with reference to FIG. 2.

In some embodiments, each of the plurality of pixels PX may operate in a single exposure method in which one exposure is performed or a multiple exposure method in which multiple exposures are performed. For example, after one exposure operation, the pixel PX may operate in a single exposure method in which pixel signals are generated through a large photodiode LPD and/or a small photodiode SPD. As another example, after generating a pixel signal through a large photodiode LPD and/or a small photodiode SPD in response to the first exposure operation, the pixel PX may operate in a multiple exposure method in which a pixel signal is additionally generated through the large photodiode LPD and/or the small photodiode SPD in response to the second exposure operation.

The row driver 120 drives the pixel array 110 in units of rows. The row driver 120 may decode a row control signal (e.g., an address signal) received from the timing controller 150, and may select at least one row line from among row lines constituting the pixel array 110 in response to the decoded row control signal. For example, the row driver 120 may generate a selection signal for selecting one of a plurality of rows. In addition, the pixel array 110 outputs a pixel signal from a row selected by a selection signal provided from the row driver 120.

The row driver 120 may transmit control signals for outputting a pixel signal to the pixel array 110, and the pixel PX may output a pixel signal by operating in response to the control signals. For example, for a large photodiode LPD and a small photodiode SPD in the readout period, the row driver 120 may generate control signals for operating in a high conversion gain HCG mode or a low conversion gain LCG mode, and provide the generated control signals to the pixel array 110. A detailed description of this will be given below with reference to FIGS. 2 to 8.

The ramp signal generator 140 may generate a ramp signal RAMP that increases or decreases with a predetermined slope and provide the ramp signal RAMP to the ADC circuit 131 of the readout circuit 130.

The readout circuit 130 may read out a pixel signal from the pixels PX of a row selected by the row driver 120 among the plurality of pixels PX. In this case, the pixel signal may include a reset signal or an image signal (or sensing signal). The readout circuit 130 converts reset signals and image signals received from the pixel array 110 through a plurality of column lines CL into digital data based on the ramp signal RAMP provided from the ramp signal generator 140 to generate and output pixel values corresponding to the plurality of pixels PX in a row unit.

The ADC circuit 131 may include a plurality of ADCs corresponding to a plurality of column lines CL. Each of the plurality of ADCs may compare a reset signal and an image signal received through a corresponding column line CL with a ramp signal RAMP, and generate a pixel value based on the comparison result. For example, the ADC may remove the reset signal from the image signal and generate a pixel value indicating the amount of light detected by the pixel PX.

A plurality of pixel values generated by the ADC circuit 131 may be output as image data IDT through the data bus 132. For example, the image data IDT may be provided to the signal processor 190 inside or outside the image sensor 100.

The data bus 132 may temporarily store pixel values output from the ADC circuit 131 and then output the stored pixel values. The data bus 132 may include a plurality of column memories and a column decoder. The plurality of pixel values stored in the plurality of column memories may be output as image data IDT under the control of the column decoder.

The ADC circuit 131 may include a plurality of Correlated Double Sampling (CDS) circuits and a plurality of counter circuits. The ADC circuit 131 may convert a pixel signal input from the pixel array 110 into a pixel value that is a digital signal. Each pixel signal received through each of the plurality of column lines CL is converted into a pixel value, which is a digital signal, by a CDS circuit and a counter circuit.

The CDS circuit may compare the pixel signal received through the column line CL with the ramp signal RAMP and output a comparison result. When the level of the ramp signal RAMP is the same as the level of the pixel signal, the CDS circuit may output a comparison signal that transitions from a first level (e.g., logic high) to a second level (e.g., logic low). The time point at which the level of the comparison signal transitions may be determined according to the level of the pixel signal.

The CDS circuit may sample and hold a pixel signal provided from a pixel PX according to a CDS method, and may generate a comparison signal based on a level corresponding to the difference by double sampling a level of specific noise (e.g., a reset signal) and a level according to the image signal.

In some embodiments, the CDS circuit may include one or more comparators. The comparator may be implemented as an Operational Transconductance Amplifier (OTA) (or a differential amplifier), for example.

The ADC circuit 131 may include a plurality of Delta Reset Sampling (DRS) circuits. The DRS circuit may read out the image signal first according to a DRS method, and then sample the pixel signal provided by reading out the reset signal.

In some embodiments, when the operation mode of the pixel PX changes during the readout period (e.g., when the operation mode changes from LCG mode to HCG mode or from HCG mode to LCG mode), the image sensor 100 may further include a bias current controller for increasing or decreasing a bias current, and a plurality of bias current controllers may be connected to the plurality of column lines CL, respectively. For example, the amount of bias current when the pixel PX operates in the HCG mode may be less than the amount of bias current when the pixel PX operates in the LCG mode.

The signal processor 190 may perform noise reduction processing, gain adjustment, waveform shaping processing, interpolation processing, white balance processing, gamma processing, edge enhancement processing, binning, and the like on image data. In some embodiments, when the pixel array 110 operates in a high conversion gain HCG mode of a large photodiode LPD, a low conversion gain LCG mode of a large photodiode LPD, a high conversion gain HCG mode of a small photodiode SPD, and a low conversion gain LCG mode of a small photodiode SPD in one frame period, the signal processor 190 may receive pixel signals corresponding to the above-described modes from the data bus 132 and merge the received pixel signals to generate an image having a high dynamic range. In an embodiment, the signal processor 190 may be provided in an external processor of the image sensor 100.

Figure 2:
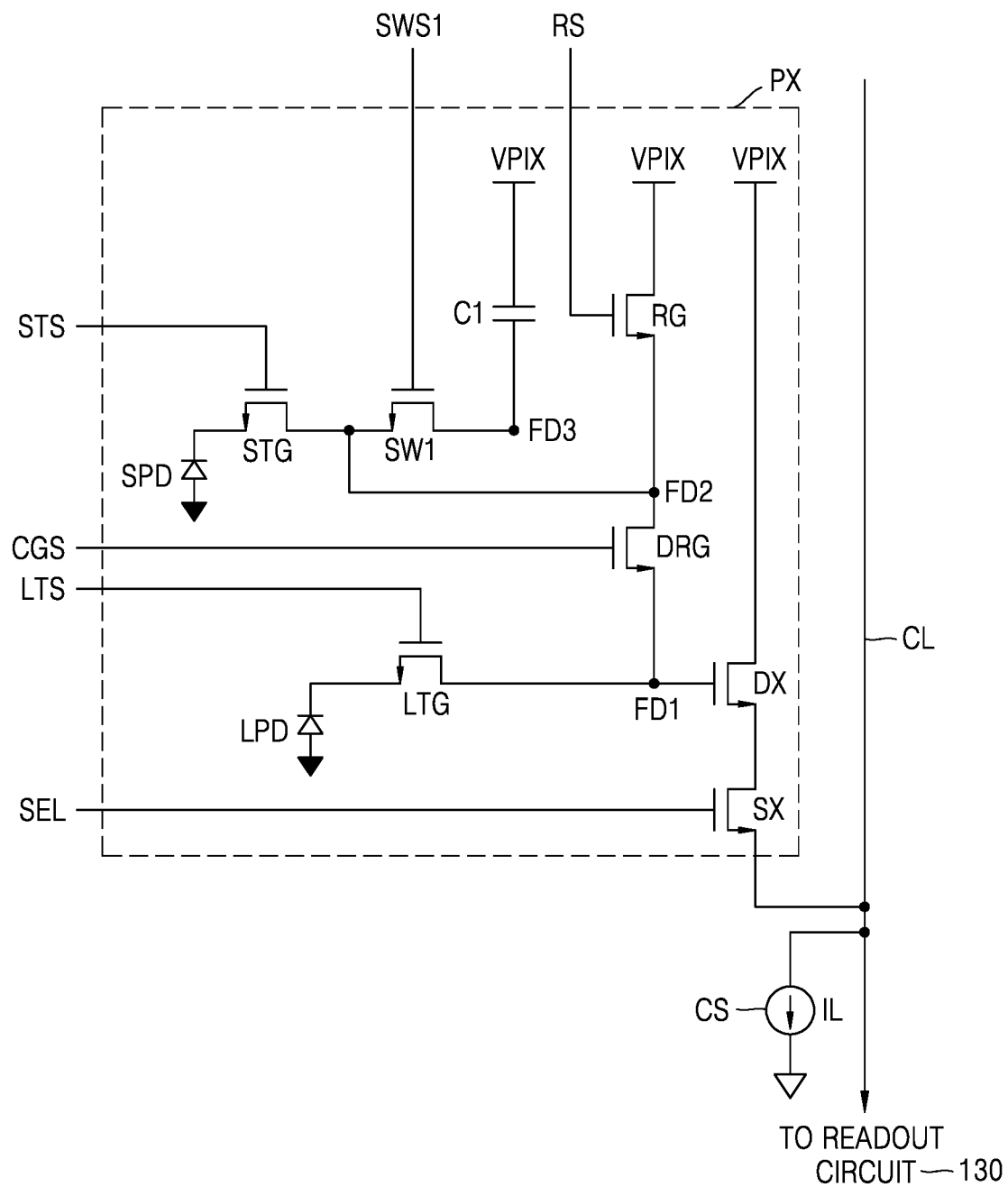
FIG. 2 is a circuit diagram of a pixel according to an embodiment of the present disclosure.

FIG. 2 is a circuit diagram of a pixel according to an embodiment of the present disclosure. In detail, FIG. 2 is a circuit diagram of the pixel PX of FIG. 1 according to an embodiment of the present disclosure.

Referring to FIGS. 1 and 2, the pixel PX may include a plurality of photodiodes, for example, a small photodiode SPD and a large photodiode LPD. The pixel PX may include a plurality of transistors, such as a first transmission transistor LTG, a second transmission transistor STG, a reset transistor RG, a driving transistor DX, a selection transistor SX, and a gain control transistor DRG (also referred to as a conversion gain control transistor), a first switch transistor SW1, and a first capacitor C1. Control signals STS, LTS, RS, SEL, CGS, and SWS1 may be applied to the pixel PX, and at least some of the control signals STS, LTS, RS, SEL, CGS, and SWS1 may be generated by the row driver 120.

The large photodiode LPD and the small photodiode SPD may generate photocharges that vary according to the intensity of light. For example, the large photodiode LPD and the small photodiode SPD may generate charges, in other words, electrons that are negative charges and holes that are positive charges, in proportion to the amount of incident light. Photocharges generated by the large photodiode LPD and the small photodiode SPD may be transmitted to and accumulated in at least one of floating diffusion nodes FD1, FD2, and FD3. A parasitic capacitor may be formed in each of the floating diffusion nodes FD1, FD2, and FD3, or an actual capacitor element may be connected thereto.

The pixel PX may include the first transmission transistor LTG. The first transmission transistor LTG may be connected between the large photodiode LPD and the first floating diffusion node FD1. The first terminal of the first transmission transistor LTG may be connected to the output terminal of the large photodiode LPD, and the second terminal of the first transmission transistor LTG may be connected to the first floating diffusion node FD1. The first transmission transistor LTG may be turned on or off in response to the first transmission control signal LTS received from the row driver 120, and may transmit photocharges generated by the large photodiode LPD to the first floating diffusion node FD1.

The pixel PX may include the conversion gain transistor DRG. The first terminal of the conversion gain transistor DRG may be connected to the first floating diffusion node FD1, and the second terminal of the conversion gain transistor DRG may be connected to second the floating diffusion node FD2. In response to the conversion gain signal CGS received from the row driver 120, the conversion gain transistor DRG may be turned on or off, and connect the first and second floating diffusion nodes FD1 and FD2 to each other.

When the conversion gain transistor DCG is turned on, the first floating diffusion node FD1 and the second floating diffusion node FD2 are connected to each other to increase capacitance and decrease the conversion gain. In other words, when the conversion gain transistor DCG is turned on, it may operate in the low conversion gain LCG mode. Conversely, when the conversion gain transistor DCG is turned off, it may operate in a high conversion gain HCG mode.

The pixel PX may include the second transmission transistor STG. The second transmission transistor STG may be connected between the small photodiode SPD and the second floating diffusion node FD2. The first terminal of the second transmission transistor STG may be connected to the output terminal of the small photodiode SPD, and the second terminal of the second transmission transistor STG may be connected to the second floating diffusion node FD2. The second transmission transistor STG may be turned on or off in response to the second transmission control signal STS received from the row driver 120, and may transmit photocharges generated by the small photodiode SPD to the second floating diffusion node FD2.

The pixel PX may include the first switch transistor SW1. The first terminal of the first switch transistor SW1 may be connected to the second floating diffusion node FD2, and the second terminal of the first switch transistor SW1 may be connected to the third floating diffusion node FD3. The first switch transistor SW1 may be turned on or turned off in response to the first switch control signal SWS1 received from the row driver 120, and connect the second and third floating diffusion nodes FD2 and FD3 to each other.

The pixel PX may include the first capacitor C1. The first terminal of the first capacitor C1 may be connected to the third floating diffusion node FD3, and the second terminal of the first capacitor C1 may be applied the pixel voltage VPIX. However, the present disclosure is not limited thereto, and a voltage other than the pixel voltage VPIX may be applied to the second terminal of the first capacitor C1. When the first switch transistor SW1 is turned on, the second and third floating diffusion nodes FD2 and FD3 may be connected to each other, and the first capacitor C1 may be connected in parallel with a parasitic capacitor formed in the second floating diffusion node FD2. Accordingly, the capacitance of the second floating diffusion node FD2 may increase. In other words, the first capacitor C1 may be used to adjust the capacitance of the second floating diffusion node FD2. Further, according to an embodiment of the present disclosure, a charge may overflow from the small photodiode SPD due to the exposure operation, and the overflowed charge may accumulate in the first capacitor C1 through the second floating diffusion node FD2.

The pixel PX may include the reset transistor RG. The reset transistor RG may reset a charge accumulated in at least one of the first, second and third floating diffusion nodes FD1, FD2, and FD3. The first terminal of the reset transistor RG may be applied a reset voltage (e.g., the pixel voltage VPIX), and the second terminal of the reset transistor RG may be connected to the second floating diffusion node FD2. However, the present disclosure is not limited thereto, and a voltage other than the pixel voltage VPIX may be applied to the second terminal of the reset transistor RG. The reset transistor RG may be turned on or off in response to the reset control signal RS received from the row driver 120, and charges accumulated in the second floating diffusion node FD2 may be discharged so that the second floating diffusion node FD2 is reset.

The pixel PX may include the driving transistor DX. The first terminal of the driving transistor DX may be connected to the selection transistor SX, and the second terminal of the driving transistor DX may be applied a driving voltage (e.g., the pixel voltage VPIX). The driving transistor DX may operate as a source follower based on a bias current IL generated by a current source CS connected to the column line CL, and may output a voltage corresponding to the charge accumulated in at least one of the first, second and third floating diffusion nodes FD1, FD2, and FD3 as a pixel signal.

The pixel PX may include the selection transistor SX. The first terminal of the selection transistor SX may be connected to the driving transistor DX, and the second terminal of the selection transistor SX may be connected to the column line CL. The selection transistor SX may be turned on or off in response to the selection signal SEL received from the row driver 120. When the selection transistor SX is turned on in the readout operation, a pixel signal including a reset signal corresponding to a reset operation or an image signal corresponding to a charge accumulation operation may be output to the column line CL.

According to an embodiment of the present disclosure, the large photodiode LPD may generate pixel signals corresponding to the dual conversion gain through the gain control transistor DRG. For example, according to the conversion gain control signal CGS transitioning to an active level or an inactive level corresponding to a specific conversion gain mode, the gain control transistor DRG is turned on or off, so that the large photodiode LPD may generate pixel signals corresponding to the dual conversion gain.

For example, when operating in the low conversion gain LCG mode during the readout period of the large photodiode LPD, the conversion gain control signal CGS may have an active level. Accordingly, the gain control transistor DRG may be turned on, and the second floating diffusion node FD2 may be connected to the first floating diffusion node FD1 to increase the capacitance.

In addition, when operating in the high conversion gain HCG mode during the readout period of the large photodiode LPD, the conversion gain control signal CGS may have an inactive level. Accordingly, the gain control transistor DRG may be turned off, and the second floating diffusion node FD2 may not be connected to the first floating diffusion node FD1. In this case, the first floating diffusion node FD1 may maintain an existing capacitance (e.g., a capacitance of a parasitic capacitor).

According to an embodiment of the present disclosure, the small photodiode SPD may generate pixel signals corresponding to the dual conversion gain through the first switch transistor SW1. For example, according to the first switch signal SWS1 transitioning to an active level or an inactive level corresponding to a specific conversion gain mode, the first switch transistor SW1 is turned on or turned off, so that the small photodiode SPD may generate pixel signals corresponding to the dual conversion gain.

For example, when operating in the low conversion gain LCG mode during the readout period of the small photodiode SPD, the first switch signal SWS1 may have an active level. Accordingly, the first switch transistor SW1 may be turned on, and the third floating diffusion node FD3 may be connected to the second floating diffusion node FD2 to increase capacitance.

In addition, when operating in the high conversion gain HCG mode during the readout period of the small photodiode SPD, the first switch signal SWS1 may have an inactive level. Accordingly, the first switch transistor SW1 may be turned off, and the third floating diffusion node FD3 may not be connected to the second floating diffusion node FD2. In this case, the second floating diffusion node FD2 may maintain an existing capacitance (e.g., a capacitance of a parasitic capacitor).

Figure 3A:
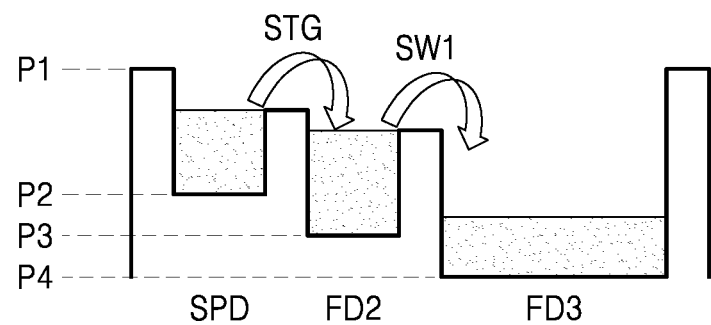
FIG. 3A is a diagram illustrating potentials of a small photodiode and floating diffusion nodes according to an embodiment of the present disclosure.
Figure 3B:
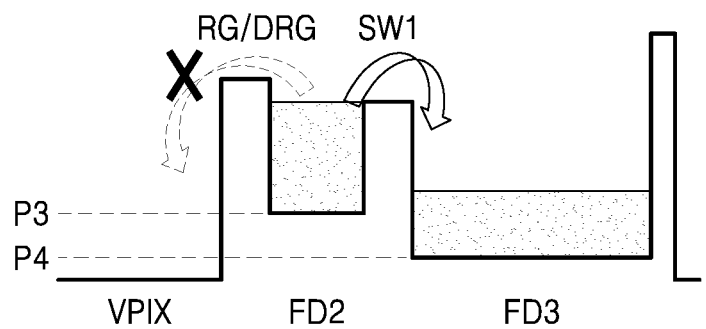
FIG. 3B is a diagram illustrating potentials of floating diffusion nodes.

FIG. 3A is a diagram illustrating potentials of a small photodiode and floating diffusion nodes according to an embodiment of the present disclosure, and FIG. 3B is a diagram illustrating potentials of floating diffusion nodes. In detail, FIGS. 3A and 3B are diagrams showing potentials of the small photodiode SPD and the second and third floating diffusion nodes FD2 and FD3 in the pixel PX of FIG. 2. The vertical axes of FIGS. 3A and 3B represent an index related to the charge potential.

Referring to FIG. 3A, because an inter-pixel threshold voltage P1 is higher than a maximum potential P2 of the small photodiode SPD or potentials P3 and P4 of the second and third floating diffusion nodes FD2 and FD3, charges accumulated in one pixel PX may not flow to another pixel PX.

In addition, because the maximum potential P2 of the small photodiode SPD is higher than the potential P3 of the second floating diffusion node FD2, when the threshold voltage between the small photodiode SPD and the second floating diffusion node FD2 decreases, charges accumulated in the small photodiode SPD may move to the second floating diffusion node FD2 due to a potential difference.

For example, when the second transmission transistor STG is turned on according to the second transmission control signal STS, because the threshold voltage between the small photodiode SPD and the second floating diffusion node FD2 is lowered, charges accumulated in the small photodiode SPD may move to the second floating diffusion node FD2.

In addition, because the potential P3 of the second floating diffusion node FD2 is higher than the potential P4 of the third floating diffusion node FD3, when the threshold voltage between the second floating diffusion node FD2 and the third floating diffusion node FD3 decreases, charges accumulated in the second floating diffusion node FD2 may move to the third floating diffusion node FD3 due to a potential difference.

For example, when the first switch transistor SW1 is turned on according to the first switch signal SWS1, because the threshold voltage between the second floating diffusion node FD2 and the third floating diffusion node FD3 is lowered, charges accumulated in the second floating diffusion node FD2 may move to the third floating diffusion node FD3.

As such, according to an embodiment of the present disclosure, by controlling the operation of the second transmission transistor STG and the first switch transistor SW1, charges generated by the small photodiode SPD may be appropriately moved to the third floating diffusion node FD3 through the second floating diffusion node FD2.

Further, referring to FIG. 2, charges that moved from the small photodiode SPD to the second floating diffusion node FD2 may move to a node to which the pixel voltage VPIX is applied in addition to the third floating diffusion node FD3. Referring to FIG. 3B, because the potential P3 of the second floating diffusion node FD2 is higher than the potential of the pixel voltage VPIX, when the threshold voltage between the second floating diffusion node FD2 and the pixel voltage VPIX is lowered, charges accumulated in the second floating diffusion node FD2 may move to a node providing the pixel voltage VPIX due to a potential difference.

For example, when the reset transistor RG and the gain control transistor DRG are turned on according to the reset control signal RS and the conversion gain control signal CGS, because the threshold voltage between the second floating diffusion node FD2 and the pixel voltage VPIX is lowered, charges accumulated in the second floating diffusion node FD2 may move to a node providing the pixel voltage VPIX.

According to an embodiment of the present disclosure, due to an exposure operation, charges may overflow from the small photodiode SPD, and the overflowed charges may accumulate in the first capacitor C1. Thus, to allow charges generated in the small photodiode SPD and moved to the second floating diffusion node FD2 to move to the third floating diffusion node FD3 rather than the node providing the pixel voltage VPIX, operations of the first switch transistor SW1, the reset transistor RG, and the gain control transistor DRG may be appropriately controlled. For example, by turning on the first switch transistor SW1 and turning off the reset transistor RG and the gain control transistor DRG, the overflowed charge may move to the third floating diffusion node FD3 and accumulate in the first capacitor C1.

Figure 4:
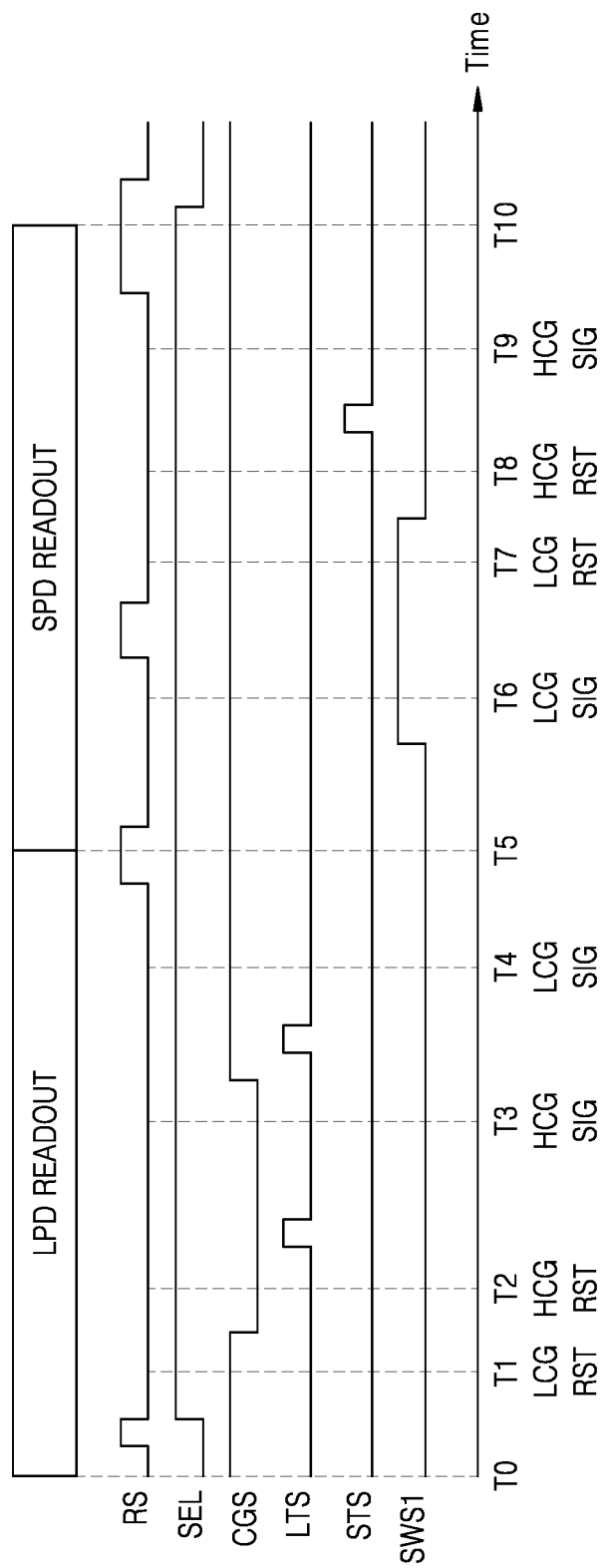
FIG. 4 is a timing diagram illustrating an operation of a pixel according to an embodiment of the present disclosure.

FIG. 4 is a timing diagram illustrating an operation of a pixel according to an embodiment of the present disclosure. In detail, FIG. 4 is a timing diagram illustrating an operation of the pixel PX of FIG. 2 according to an embodiment of the present disclosure.

Referring to FIG. 4, the pixel PX may read out pixel signals corresponding to the large photodiode LPD during the first readout section LPD READOUT, and read out pixel signals corresponding to the small photodiode SPD during the second readout section SPD READOUT. Hereinafter, operations performed in the first readout section LPD READOUT and the second readout section SPD READOUT will be described.

First, in the first readout section LPD READOUT, the conversion gain control signal CGS may transition from a second level (e.g., logic low) to a first level (e.g., logic high) to maintain the first level. Accordingly, the gain control transistor DRG may be turned on, the first floating diffusion node FD1 may be connected to the second floating diffusion node FD2, and the pixel PX may operate in a low conversion gain LCG mode. In addition, the reset control signal RS may transition from a low level to a high level to maintain a high level. Accordingly, the reset transistor RG may be turned on, and the first and second floating diffusion nodes FD1 and FD2 may be reset (e.g., a reset operation is performed). For example, the first and second floating diffusion nodes FD1 and FD2 may be reset based on the pixel voltage VPIX.

After the reset control signal RS transitions from the high level to the low level, the selection signal SEL transitions from a low level to a high level to maintain a high level during the remainder of the first readout section. Accordingly, the selection transistor SX may be turned on, and a reset signal corresponding to the reset first and second floating diffusion nodes FD1 and FD2 may be output through the column line CL. In other words, referring to FIG. 3, a pixel signal output at a first time T1 is a reset signal LCG RST in the low conversion gain LCG mode of the large photodiode LPD.

After the first time T1, the conversion gain control signal CGS may transition from the high level to the low level. Accordingly, because the gain control transistor DRG may be turned off, and the first floating diffusion node FD1 may not be connected to the second floating diffusion node FD2, the pixel PX may operate in a high conversion gain HCG mode. In addition, a reset signal corresponding to the reset first floating diffusion node FD1 may be output through the column line CL. In other words, referring to FIG. 3, the pixel signal output at the second time T2 is the reset signal HCG RST in the high conversion gain HCG mode of the large photodiode LPD.

After the second time T2, the first transmission control signal LTS may transition from a low level to a high level. Accordingly, the first transmission transistor LTG may be turned on, and charges generated by the large photodiode LPD may be moved to the first floating diffusion node FD1 and accumulated (e.g., an accumulate operation is performed). At this time, the conversion gain control signal CGS may maintain a low level, and the pixel PX may operate in a high conversion gain HCG mode. In addition, an image signal corresponding to the accumulated first floating diffusion node FD1 may be output through the column line CL. In other words, referring to FIG. 3, the pixel signal output at the third time T3 is the image signal HCG SIG in the high conversion gain HCG mode of the large photodiode LPD.

After the third time T3, the conversion gain control signal CGS may transition from the low level to the high level. Accordingly, because the gain control transistor DRG may be turned off, and the first floating diffusion node FD1 may not be connected to the second floating diffusion node FD2, the pixel PX may operate in a high conversion gain HCG mode. In addition, the first transmission control signal LTS may transition from a low level to a high level. Accordingly, the first transmission transistor LTG may be turned on, and charges generated by the large photodiode LPD may be moved to the first floating diffusion node FD1 and accumulated (e.g., an accumulate operation). In addition, an image signal corresponding to the accumulated first floating diffusion node FD1 may be output through the column line CL. In other words, referring to FIG. 3, the pixel signal output at the fourth time T4 is the image signal LCG SIG in the low conversion gain LCG mode of the large photodiode LPD.

After the fourth time T4, the reset control signal RS may transition from the low level to the high level. In addition, the conversion gain control signal CGS may maintain a high level. Accordingly, the reset transistor RG and the gain control transistor DRG may be turned on, and the first and second floating diffusion nodes FD1 and FD2 may be reset. For example, referring to FIG. 3, charges remaining after the output of pixel signals of the large photodiode LPD may be removed at a fifth time T5.

In the second readout section SPD READOUT, the conversion gain control signal CGS may maintain a high level. In addition, the first switch signal SWS1 may transition from a low level to a high level. Accordingly, the first switch transistor SW1 may be turned on, the second floating diffusion node FD2 may be connected to the third floating diffusion node FD3, and the pixel PX may operate in a low conversion gain LCG mode. At this time, because the first capacitor C1 is connected to the third floating diffusion node FD3, the charges accumulated in the second and third floating diffusion nodes FD2 and FD3 may correspond to the charges accumulated in the first capacitor C1. Charges overflowed from the small photodiode SPD may accumulate in the first capacitor C1 by the exposure operation. In addition, image signals corresponding to the accumulated second and third floating diffusion nodes FD2 and FD3 may be output through the column line CL. In other words, referring to FIG. 3, the pixel signal output at the sixth time T6 is the image signal LCG SIG in the low conversion gain LCG mode of the small photodiode SPD.

After the sixth time T6, the reset control signal RS may transition from the low level to the high level. In addition, the first switch signal SWS1 may maintain a high level. Accordingly, the reset transistor RG and the first switch transistor SW1 may be turned on, and the second and third floating diffusion nodes FD2 and FD3 may be reset. For example, the second and third floating diffusion nodes FD2 and FD3 may be reset based on the pixel voltage VPIX.

In addition, the reset control signal RS may transition from a high level to a low level. In addition, a reset signal corresponding to the reset second and third floating diffusion nodes FD2 and FD3 may be output through the column line CL. In other words, referring to FIG. 3, the pixel signal output at the seventh time T7 is the reset signal LCG RST in the low conversion LCG mode of the small photodiode SPD.

After the seventh time T7, the first switch signal SWS1 may transition from the high level to the low level. Accordingly, because the first switch transistor SW1 may be turned off, and the second floating diffusion node FD2 may not be connected to the third floating diffusion node FD3, the pixel PX may operate in a high conversion gain HCG mode. In addition, a reset signal corresponding to the reset second floating diffusion node FD2 may be output through the column line CL. In other words, referring to FIG. 3, the pixel signal output at the eighth time T8 is the reset signal HCG RST in the high conversion gain HCG mode of the small photodiode SPD.

After the eighth time T8, the second transmission control signal STS may transition from the low level to the high level. Accordingly, the second transmission transistor STG may be turned on, and charges generated by the small photodiode SPD may be moved to the second floating diffusion node FD2 and accumulated (e.g., an accumulate operation). At this time, the first switch signal SWS1 may maintain a low level, and the pixel PX may operate in a high conversion gain HCG mode. In addition, an image signal corresponding to the accumulated second floating diffusion node FD2 may be output through the column line CL. In other words, referring to FIG. 3, the pixel signal output at the ninth time T9 is the image signal HCG SIG in the high conversion gain HCG mode of the small photodiode SPD.

After the ninth time T9, the reset control signal RS may transition from the low level to the high level. Accordingly, the reset transistor RG may be turned on, and the floating diffusion node FD2 may be reset. For example, referring to FIG. 3, charges remaining after the pixel signals of the small photodiode SPD are output may be removed at a tenth time T10.

Figure 5:
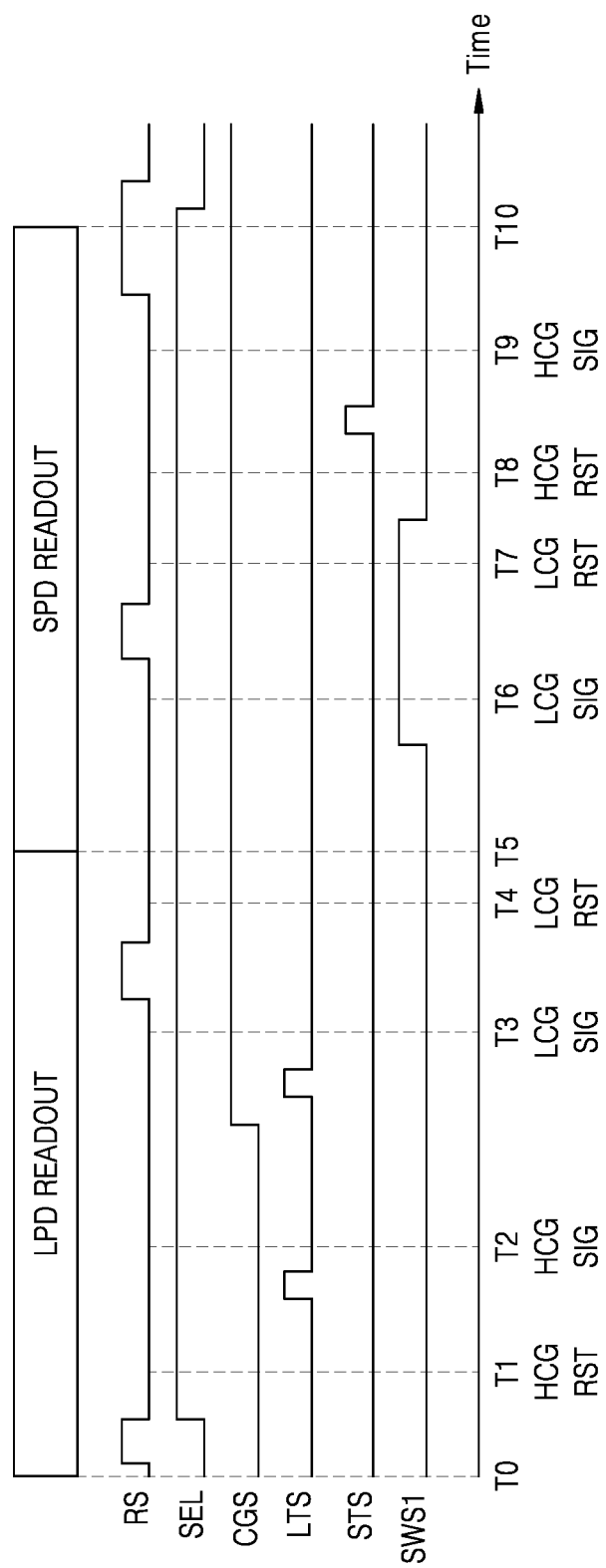
FIG. 5 is a timing diagram illustrating an operation of a pixel according to an embodiment of the present disclosure.

FIG. 5 is a timing diagram illustrating an operation of a pixel according to an embodiment of the present disclosure. In detail, FIG. 5 is a view showing a modified embodiment of FIG. 4.

Compared with the embodiment of FIG. 4, the embodiment of FIG. 5 changes the output order of the reset signal and image signal for each mode of the large photodiode LPD, and the order of outputting the reset signal and the image signal for each mode of the small photodiode SPD may be the same. For example, in the embodiment of FIG. 4, pixel signals of the large photodiode LPD may be output in the order of "reset signal LCG RST in low conversion gain LCG mode"-"reset signal HCG RST in high conversion gain HCG mode"-"image signal HCG SIG in high conversion gain HCG mode"-"image signal LCG SIG in low conversion gain LCG mode".

On the other hand, in the embodiment of FIG. 5, pixel signals of the large photodiode LPD may be output in the order of "reset signal HCG RST in high conversion gain HCG mode"-"image signal HCG SIG in high conversion gain HCG mode"-"image signal LCG SIG in low conversion gain LCG mode"-"reset signal LCG RST in low conversion gain LCG mode". In the embodiment of FIG. 5, control signals when each of the pixel signals of the large photodiode LPD is output may be substantially the same as those described above with reference to FIG. 4, and thus redundant descriptions thereof are omitted.

Figure 6:
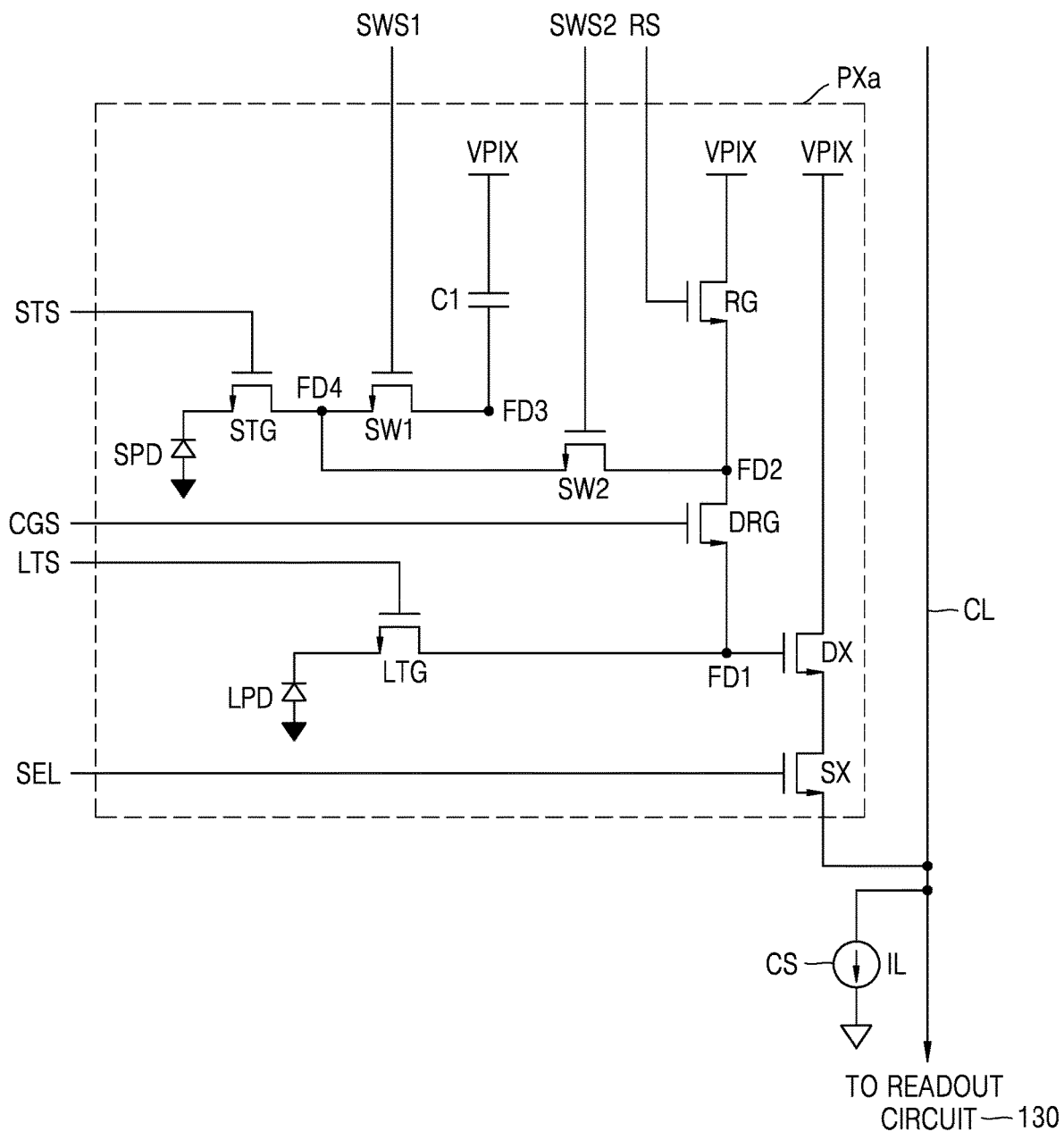
FIG. 6 is a circuit diagram of a pixel according to an embodiment of the present disclosure.

FIG. 6 is a circuit diagram of a pixel according to an embodiment of the present disclosure. In detail, FIG. 6 is a view showing a modified embodiment of FIG. 2.

Compared with the pixel PX of FIG. 2, a pixel PXa of FIG. 5 may additionally include a second switch transistor SW2. For example, the second switch transistor SW2 may be disposed on a line corresponding to the second floating diffusion node FD2 in FIG. 2. In other words, the first terminal of the second switch transistor SW2 may be connected to a node (hereinafter referred to as a fourth floating diffusion node FD4) at which the second transmission transistor STG and the first switch transistor SW1 are connected to each other, and the second terminal of the second switch transistor SW2 may be connected to a node (hereinafter referred to as a second floating diffusion node FD2) to which the reset transistor RG and the gain control transistor DRG are connected to each other. The remaining components of the pixel PXa of FIG. 5 may be configured in substantially the same manner as the pixel PX of FIG. 2.

The second switch transistor SW2 may be turned on or off in response to the second switch signal SWS2, and charges generated by the small photodiode SPD and moved to the fourth floating diffusion node FD4 may be prevented from additionally moving to the second floating diffusion node FD2. This will be described in detail with reference to FIG. 7.

Figure 7:
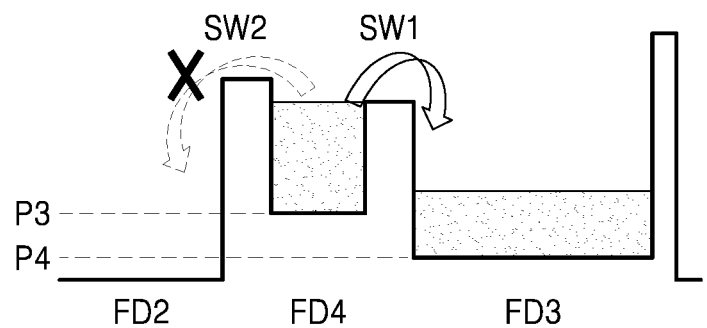
FIG. 7 is a diagram illustrating potentials of floating diffusion nodes according to an embodiment of the present disclosure.

FIG. 7 is a diagram illustrating potentials of floating diffusion nodes according to an embodiment of the present disclosure. In detail, FIG. 7 is a diagram showing the potentials of the second, third and fourth floating diffusion nodes FD2, FD3, and FD4 in the pixel PXa of FIG. 6. The vertical axis of FIG. 7 represents an index related to the charge potential.

First, referring to FIG. 6, charges that moved from the small photodiode SPD to the fourth floating diffusion node FD4 may move to the second floating diffusion node FD2 or the third floating diffusion node FD3.

Referring to FIG. 7, because the potential P3 of the fourth floating diffusion node FD4 is higher than the potential P4 of the third floating diffusion node FD3, when the threshold voltage between the fourth floating diffusion node FD4 and the third floating diffusion node FD3 decreases, charges accumulated in the fourth floating diffusion node FD4 may move to the third floating diffusion node FD3 due to a potential difference.

For example, when the first switch transistor SW1 is turned on according to the first switch signal SWS1, because the threshold voltage between the fourth floating diffusion node FD4 and the third floating diffusion node FD3 is lowered, charges accumulated in the fourth floating diffusion node FD4 may move to the third floating diffusion node FD3.

In addition, because the potential P3 of the fourth floating diffusion node FD4 is higher than the potential of the second floating diffusion node FD2, when the threshold voltage between the fourth floating diffusion node FD4 and the second floating diffusion node FD2 is lowered, charges accumulated in the fourth floating diffusion node FD4 may move to the second floating diffusion node FD2 due to a potential difference.

For example, when the second switch transistor SW2 is turned on according to the second switch signal SWS2, because the threshold voltage between the fourth floating diffusion node FD4 and the second floating diffusion node FD2 is lowered, charges accumulated in the fourth floating diffusion node FD4 may move to the second floating diffusion node FD2.

According to an embodiment of the present disclosure, due to an exposure operation, charges may overflow from the small photodiode SPD, and the overflowed charges may accumulate in the first capacitor C1. Thus, to allow charges generated in the small photodiode SPD and moved to the fourth floating diffusion node FD4 to move to the third floating diffusion node FD3 rather than the second floating diffusion node FD2, operations of the first switch transistor SW1 and the second switch transistor SW2 may be appropriately controlled. For example, by turning on the first switch transistor SW1 and turning off the second switch transistor SW2, the overflowed charge may move to the third floating diffusion node FD3 and accumulate in the first capacitor C1.

Figure 8:
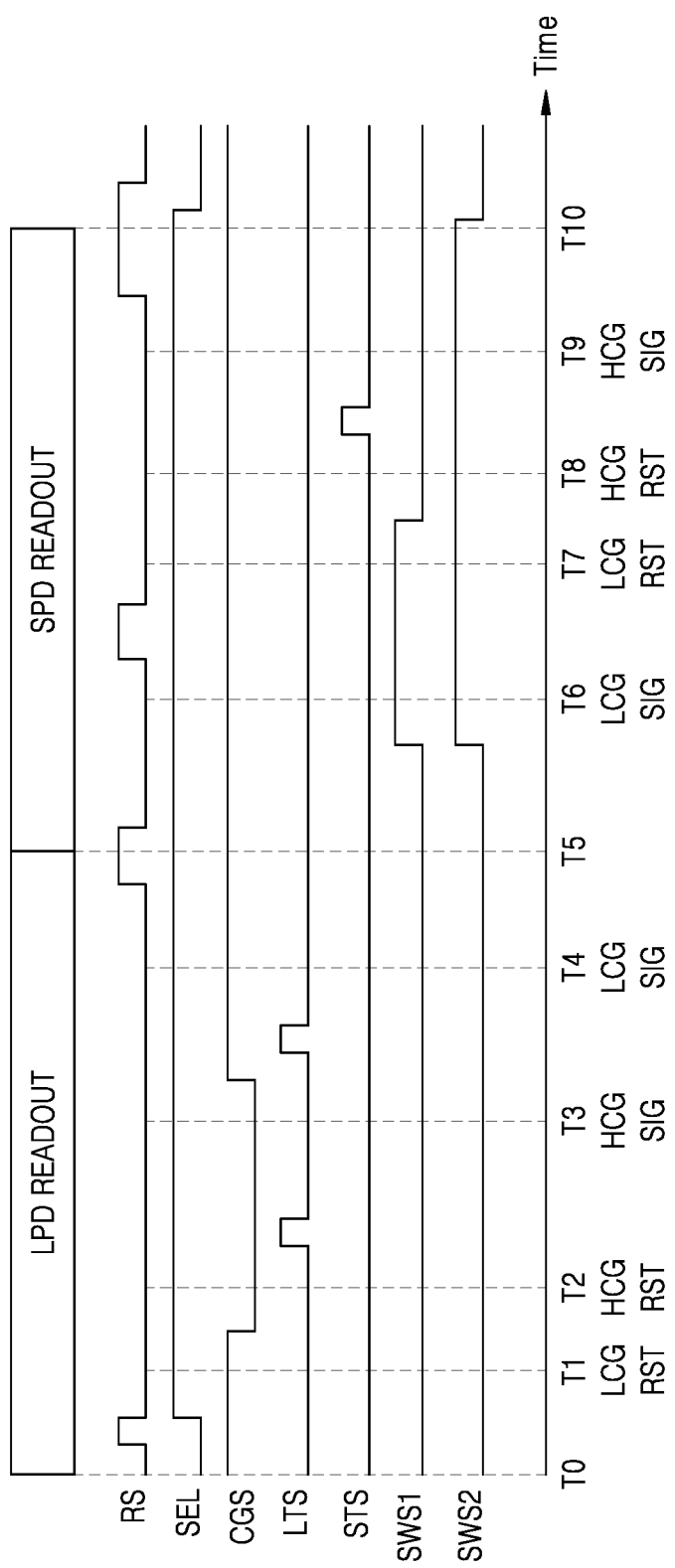
FIG. 8 is a timing diagram illustrating an operation of a pixel according to an embodiment of the present disclosure.

FIG. 8 is a timing diagram illustrating an operation of a pixel according to an embodiment of the present disclosure. In detail, FIG. 8 is a timing diagram illustrating an operation of the pixel PXa of FIG. 6 according to an embodiment of the present disclosure.

Referring to FIG. 8, the second switch signal SWS2 may maintain a low level in the first readout section LPD READOUT for reading out pixel signals corresponding to the large photodiode LPD. Accordingly, the second switch transistor SW2 may be maintained turned off in the first readout section LPD READOUT. The states of the remaining control signals RS, SEL, CGS, LTS, STS, and SWS1 in the first readout section LPD READOUT are the same as those described above with reference to FIG. 4, and thus redundant descriptions thereof are omitted.

In addition, the second switch signal SWS2 may transition from a low level to a high level and maintain a high level in the second readout section SPD READOUT for reading out pixel signals corresponding to the small photodiode SPD. For example, after the charge remaining after the output of the pixel signals of the large photodiode LPD is removed by the reset operation at the fifth time T5, the second switch signal SWS2 transitions from the low level to the high level, and thus, maintains the high level during the remainder of the second readout section SPD READOUT. Accordingly, the second switch transistor SW2 may be turned on, and the second and fourth floating diffusion nodes FD2 and FD4 may be connected to each other. When the second and fourth floating diffusion nodes FD2 and FD4 of FIG. 6 are connected, the structure of the pixel PXa of FIG. 6 may be substantially the same as that of the pixel PX of FIG. 2. Accordingly, the remaining control signals RS, SEL, CGS, LTS, STS, and SWS1 in the second readout section SPD READOUT may have the same states as described above with reference to FIG. 4, and redundant descriptions thereof are omitted.

Figure 9:
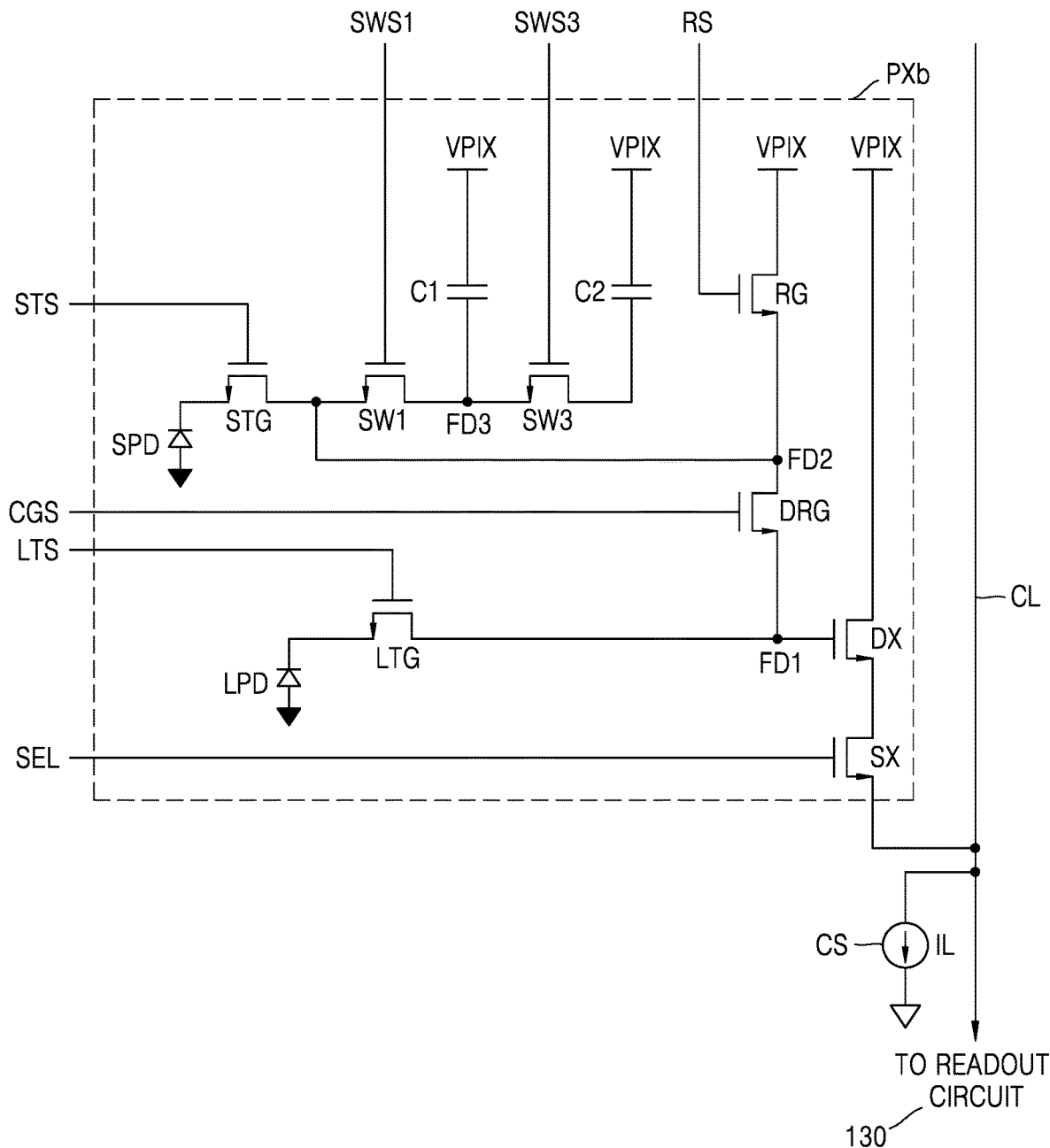
FIG. 9 is a circuit diagram of a pixel according to an embodiment of the present disclosure.

FIG. 9 is a circuit diagram of a pixel according to an embodiment of the present disclosure. In detail, FIG. 9 is a view showing a modified embodiment of FIG. 2.

Compared with the pixel PX of FIG. 2, a pixel PXb of FIG. 9 may additionally include a third switch transistor SW3 and a second capacitor C2. The remaining components of the pixel PXb of FIG. 9 may be configured in substantially the same manner as the pixel PX of FIG. 2.

For example, the first terminal of the third switch transistor SW3 may be connected to the third floating diffusion node FD3, and the second terminal of the third switch transistor SW3 may be connected to the second capacitor C2. In addition, the first terminal of the second capacitor C2 may be connected to the third switch transistor SW3, and the pixel voltage VPIX may be applied to the second terminal of the second capacitor C2.

The third switch transistor SW3 may be turned on or turned off in response to the third switch signal SWS3. When the third switch transistor SW3 is turned on, charges may accumulate in the second capacitor C2. Charges overflowed from the small photodiode SPD may accumulate in the second capacitor C2 by the exposure operation. As such, the third switch transistor SW3 and the second capacitor C2 may perform the same functions as the first switch transistor SW1 and the first capacitor C1. In other words, the pixel PXb of FIG. 9 is an embodiment in which a plurality of sets of the first switch transistor SW1 and the first capacitor C1 for accumulating charges overflowed from the small photodiode SPD are implemented. As the plurality of capacitors C1 and C2 are connected in parallel, a high capacitance may be implemented.

On the other hand, in the illustration and description of FIG. 9, although the set configuration is shown and described as two, the present disclosure is not limited thereto, and more than three set configurations may be employed in embodiments of the present disclosure.

Figure 10:
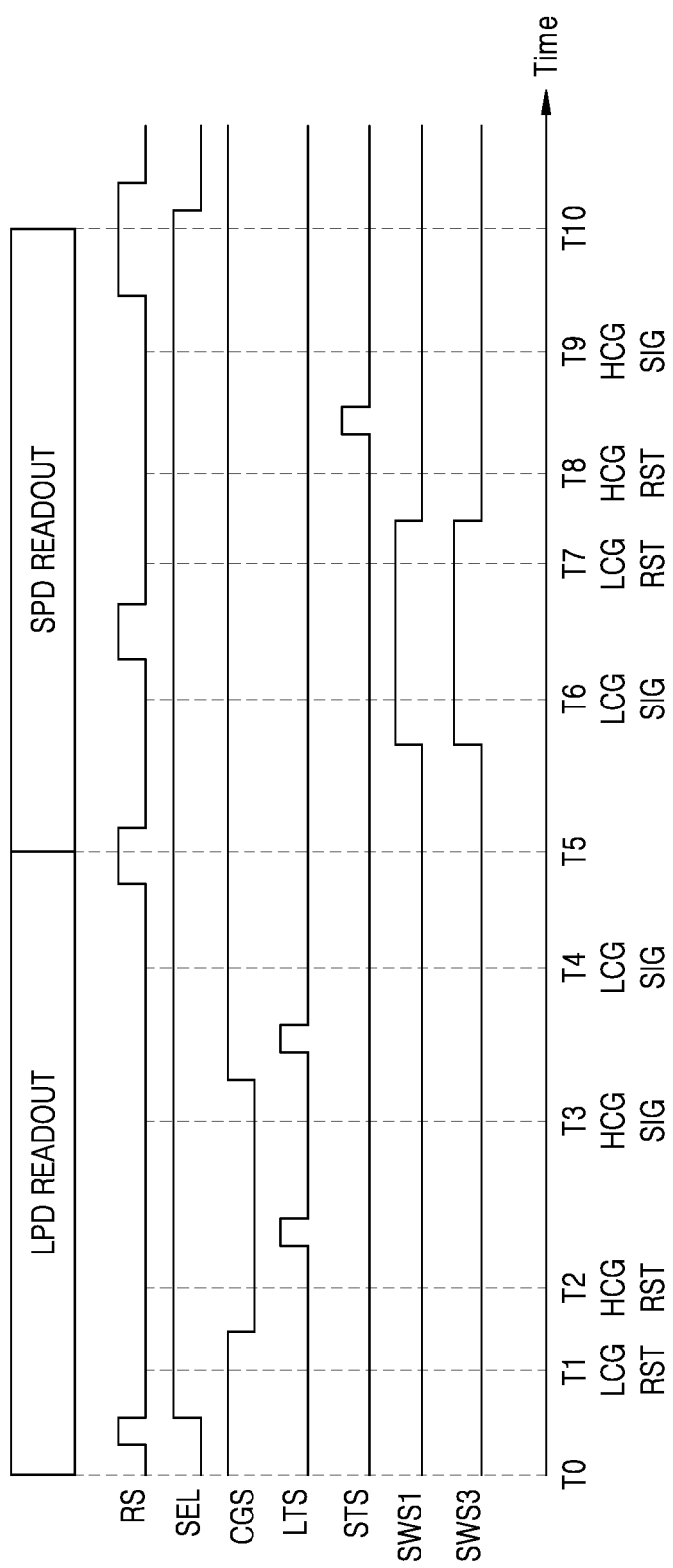
FIG. 10 is a timing diagram illustrating an operation of a pixel according to an embodiment of the present disclosure.

FIG. 10 is a timing diagram illustrating an operation of a pixel according to an embodiment of the present disclosure. In detail, FIG. 10 is a timing diagram illustrating an operation of the pixel PXb of FIG. 9 according to an embodiment of the present disclosure.

Referring to FIG. 10, the third switch signal SWS3 may maintain a low level in the first readout section LPD READOUT for reading out pixel signals corresponding to the large photodiode LPD. Accordingly, the third switch transistor SW3 may be maintained turned off in the first readout section LPD READOUT. The states of the remaining control signals RS, SEL, CGS, LTS, STS, and SWS1 in the first readout section LPD READOUT are the same as those described above with reference to FIG. 4, and thus redundant descriptions thereof are omitted.

In addition, the third switch signal SWS3 may have a low level or a high level in the second readout section SPD READOUT for reading out pixel signals corresponding to the small photodiode SPD. For example, the third switch signal SWS3 may have substantially the same level as the first switch signal SWS1. Accordingly, the first switch transistor SW1 and the third switch transistor SW3 may be turned on or turned off substantially at the same time. Moreover, the remaining control signals RS, SEL, CGS, LTS, STS, and SWS1 in the second readout section SPD READOUT may have the same states as described above with reference to FIG. 4, and redundant descriptions thereof are omitted.

Figure 11A:
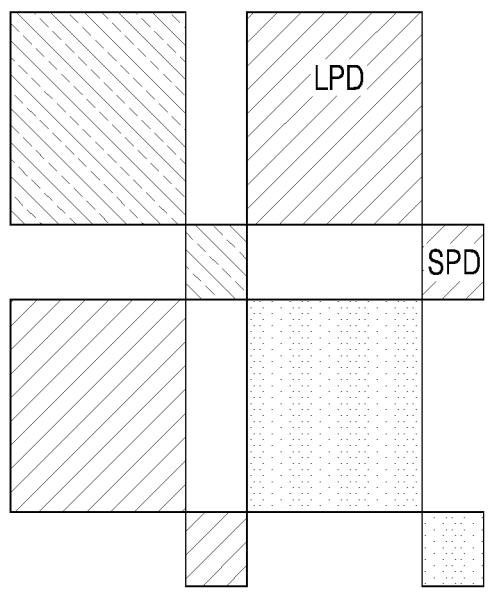
FIGS. 11A and 11B are diagrams illustrating a split photodiode structure of a pixel according to an embodiment of the present disclosure.
Figure 11B:
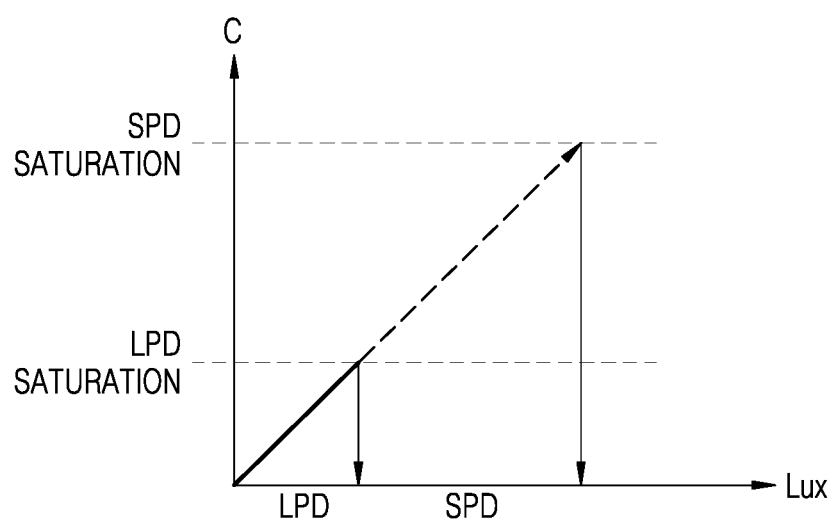

FIGS. 11A and 11B are diagrams illustrating a split photodiode structure of a pixel according to an embodiment of the present disclosure. Hereinafter, for convenience of description, the description is based on the pixel PX of FIG. 2, but the same description may be applied to the pixel PXa of FIG. 6 or the pixel PXb of FIG. 9.

Referring to FIG. 11A, the pixel array 110 may include a plurality of pixels PX arranged in a matrix on a plane. Each of the plurality of pixels PX may include a photoelectric conversion unit and a pixel circuit unit. The photoelectric conversion unit may vertically overlap the pixel circuit unit.

The photoelectric conversion unit may include a macro lens, a color filter, and a photoelectric conversion element. In some embodiments, the photoelectric conversion unit may further include a color filter, a protective layer, and an insulating structure. The microlens may be disposed on the photoelectric conversion element, and may be configured to condense light incident from the outside to be incident on the photoelectric conversion element.

The pixel PX may include a large photodiode LPD and a small photodiode SPD. In this case, as shown in FIG. 11A, the large photodiode LPD of each pixel PX may have a wide light-receiving area, and the small photodiode SPD may have a narrow light-receiving area.

Referring to FIG. 11B, since the large photodiode LPD has a wide light-receiving area, it may be saturated faster than the small photodiode SPD. Therefore, the large photodiode LPD may be used in the low-luminance region, and the small photodiode SPD may be used in the high-luminance region.

The color filter may selectively transmit an optical signal of a specific wavelength range, and may be interposed between a microlens and a photoelectric conversion element. The pixel circuit unit may be formed under the photoelectric conversion unit, and may include a floating diffusion node, a source/drain, a load resistor, a gate, a via contact, and a wiring structure.

Figure 12:
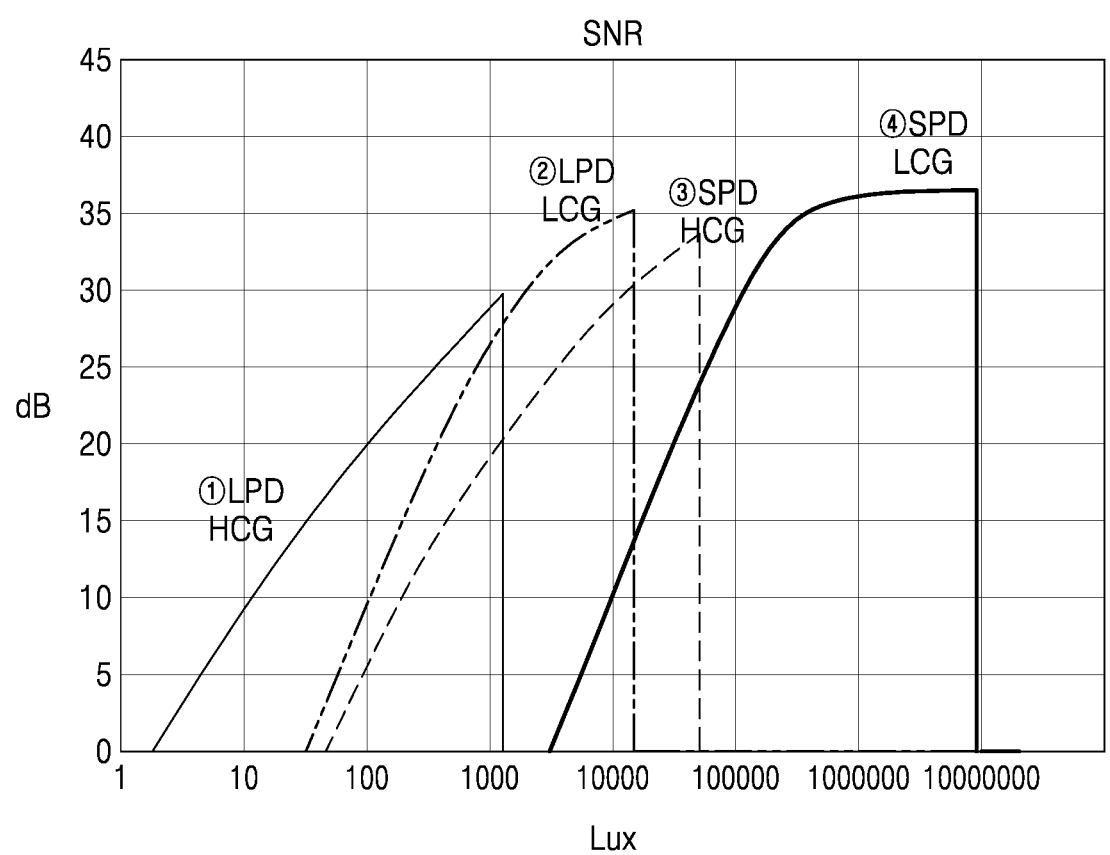
FIG. 12 is a diagram illustrating a signal-to-noise ratio (SNR) of a pixel according to an embodiment of the present disclosure.

FIG. 12 is a diagram illustrating a signal-to-noise ratio SNR of a pixel according to an embodiment of the present disclosure. The horizontal axis of FIG. 12 represents the luminance Lux, and the vertical axis represents the signal-to-noise ratio SNR expressed in dB. In addition, hereinafter, for convenience of description, the description is based on the pixel PX of FIG. 2, but the same description may be applied to the pixel PXa of FIG. 6 or the pixel PXb of FIG. 9.

The dynamic range of the pixel PX may be expanded by lowering the sensitivity of the photodiode. Accordingly, the pixel PX according to the embodiment of the present disclosure may increase a dynamic range by using a large photodiode LPD with high sensitivity and a small photodiode SPD with low sensitivity together. The large photodiode LPD may generate pixel signals corresponding to low luminance, and the small photodiode SPD may generate pixel signals corresponding to high luminance.

In addition, the dynamic range of the pixel PX may be expanded by increasing the capacitance of the floating diffusion node. Accordingly, the pixel PX according to the embodiment of the present disclosure may generate pixel signals with a dual conversion gain with respect to the large photodiode LPD.

In an embodiment, the pixel PX may generate pixel signals corresponding to the lowest luminance range through the high conversion gain HCG mode ① of the large photodiode LPD. Since the conversion gain is higher, noise components of the pixel signal may be removed. Therefore, in order to increase the SNR of the pixel signal corresponding to the lowest luminance range in which the signal component in the pixel signal is relatively small, a high conversion gain HCG mode may be applied.

In addition, the pixel PX may generate pixel signals corresponding to the low-luminance range through the low conversion gain (LCG) mode ② of the large photodiode LPD. Accordingly, a dynamic range of pixel signals generated by the large photodiode LPD may increase. When a pixel signal is generated in a low conversion gain LCG mode, a noise component in the pixel signal may increase due to an increase in capacitance. However, by using a large photodiode LPD having a wide light-receiving area, the signal component of the pixel signal may also be increased, and thus, the SNR of the pixel signal may be increased.

On the other hand, using a small photodiode SPD may increase the dynamic range, but due to the low sensitivity of the small photodiode SPD, a signal component in a pixel signal may decrease, and thus, SNR may decrease. Accordingly, the pixel PX according to the embodiment of the present disclosure may generate pixel signals with a dual conversion gain with respect to the small photodiode SPD.

In an embodiment, the pixel PX may generate pixel signals corresponding to the highest luminance range through the low conversion gain LCG mode ④ of the small photodiode SPD. Since the capacitance is higher, the dynamic range may be expanded, so that the low conversion gain LCG mode may be applied to include the dynamic range up to the highest possible luminance range. When a pixel signal is generated in a low conversion gain LCG mode, SNR may decrease due to an increase in capacitance. In particular, in the part (e.g., around 10000 Lux in FIG. 12) where the luminance range corresponding to the large photodiode LPD is changed to the luminance range corresponding to the small photodiode SPD, SNR may decrease rapidly.

Therefore, in order to prevent a sharp decrease in SNR, the pixel PX may generate pixels corresponding to a high luminance range through the high conversion gain HCG mode ③ of the small photodiode SPD. Since the conversion gain increases, the noise component of the pixel signal may be removed, and thus, the SNR of the pixel signal generated in the high conversion gain HCG mode may increase.

According to the embodiment of the present disclosure, the dynamic range may be further expanded and the SNR may be further increased by using the first switch transistor SW1 and the first capacitor C1 of FIG. 2. For example, in the low conversion gain LCG mode, the first switch transistor SW1 is turned on and the first capacitor C1 is connected to the second floating diffusion node FD2, so that the capacitance may increase. In other words, the dynamic range may be expanded. Further, in the high conversion gain HCG mode, the first switch transistor SW1 is turned off and the first capacitor C1 is not connected to the second floating diffusion node FD2, so that the capacitance may be reduced. In other words, the SNR may be increased.

As such, according to an embodiment of the present disclosure, the pixel PX may generate pixel signals corresponding to the dual conversion gain based on the large photodiode LPD and the small photodiode SPD, and synthesize the generated pixel signals to generate an SNR-enhanced image while having a wide dynamic range.

Figure 13:
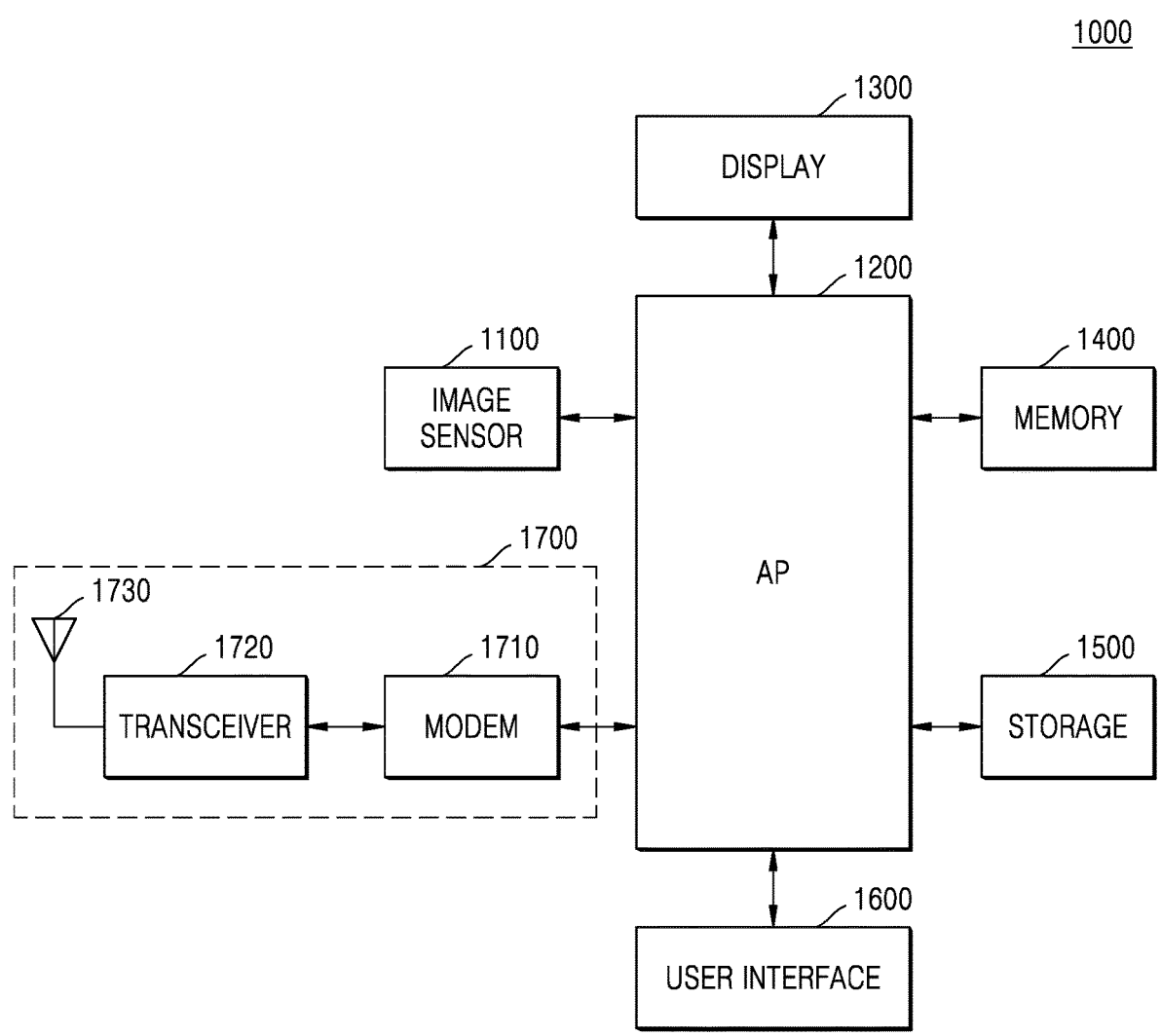
FIG. 13 is a block diagram illustrating an electronic device according to an embodiment of the present disclosure.

FIG. 13 is a block diagram illustrating an electronic device according to an embodiment of the present disclosure.

Referring to FIG. 13, the electronic device 1000 may include an image sensor 1100, an application processor 1200, a display 1300, a memory 1400, a storage 1500, a user interface 1600, and a wireless transceiver 1700. The image sensor 1100 of FIG. 13 may correspond to the image sensor 100 of FIG. 1. A redundant description related to FIG. 1 will be omitted.

The application processor 1200 may control the overall operation of the electronic device 1000 and may be provided as a system-on-chip (SoC) that drives an application program, an operating system, and the like. The application processor 1200 may receive image data from the image sensor 1100 and may perform image processing on the received image data. In some embodiments, the application processor 1200 may store the received image data and/or processed image data in the memory 1400 or the storage 1500.

The memory 1400 may store programs and/or data processed or executed by the application processor 1200. The storage 1500 may be implemented as a nonvolatile memory device such as a NAND flash or a resistive memory, and for example, the storage 1500 may be provided as a memory card (multi-media card (MMC), embedded MMC (eMMC), secure digital (SD), and micro SD) or the like. The storage 1500 may store data and/or programs for execution algorithms that control the image processing operation of the application processor 1200, and data and/or programs may be loaded into the memory 1400 when the image processing operation is performed.

The user interface 1600 may be implemented with various devices capable of receiving user input, such as a keyboard, a curtain key panel, a touch panel, a fingerprint sensor, and a microphone. The user interface 1600 may receive a user input and provide a signal corresponding to the received user input to the application processor 1200. The wireless transceiver 1700 may include a modem 1710, a transceiver 1720, and an antenna 1730.

Figure 14:
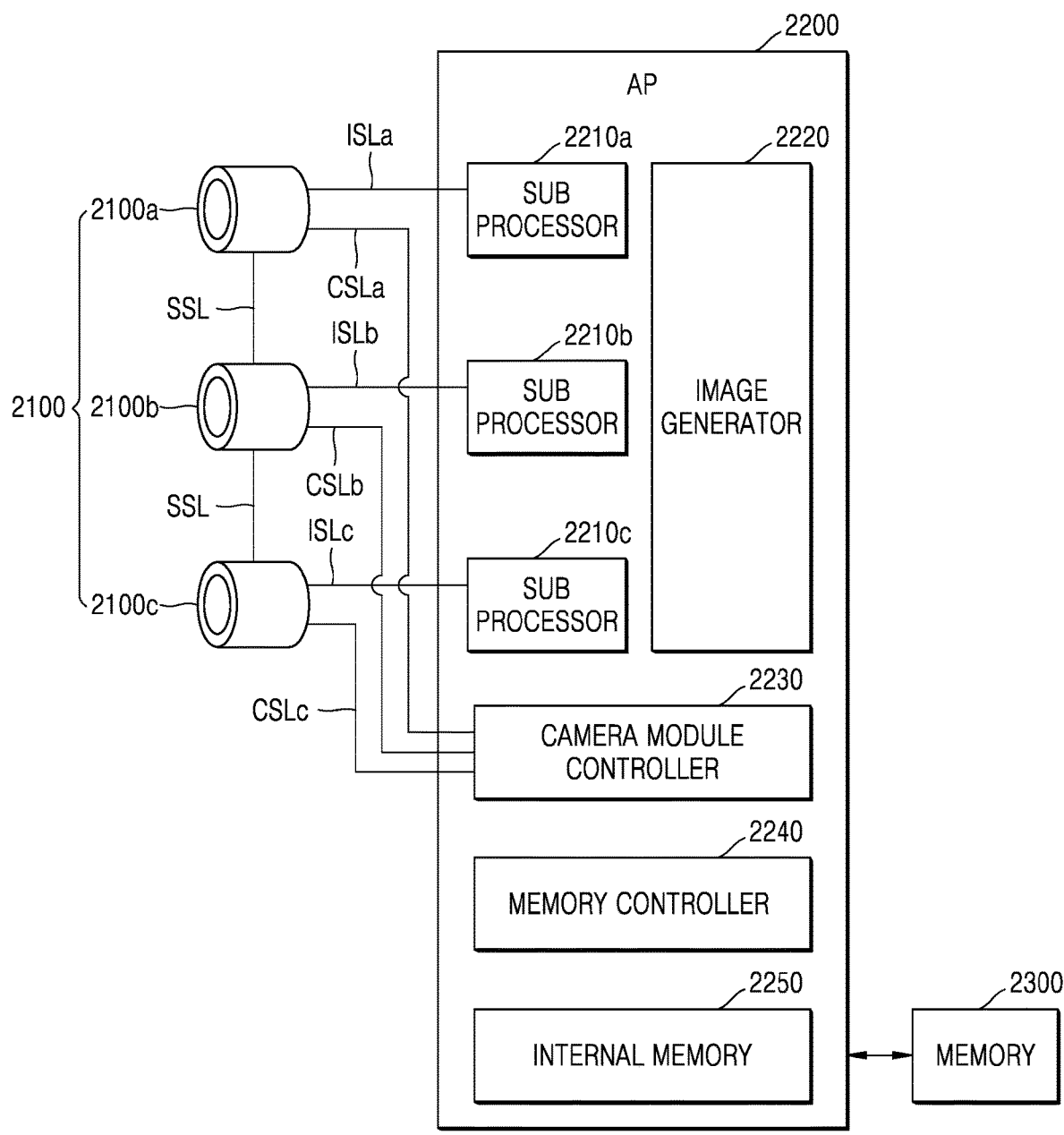
FIG. 14 is a block diagram illustrating a part of an electronic device according to an embodiment of the present disclosure.
Figure 15:
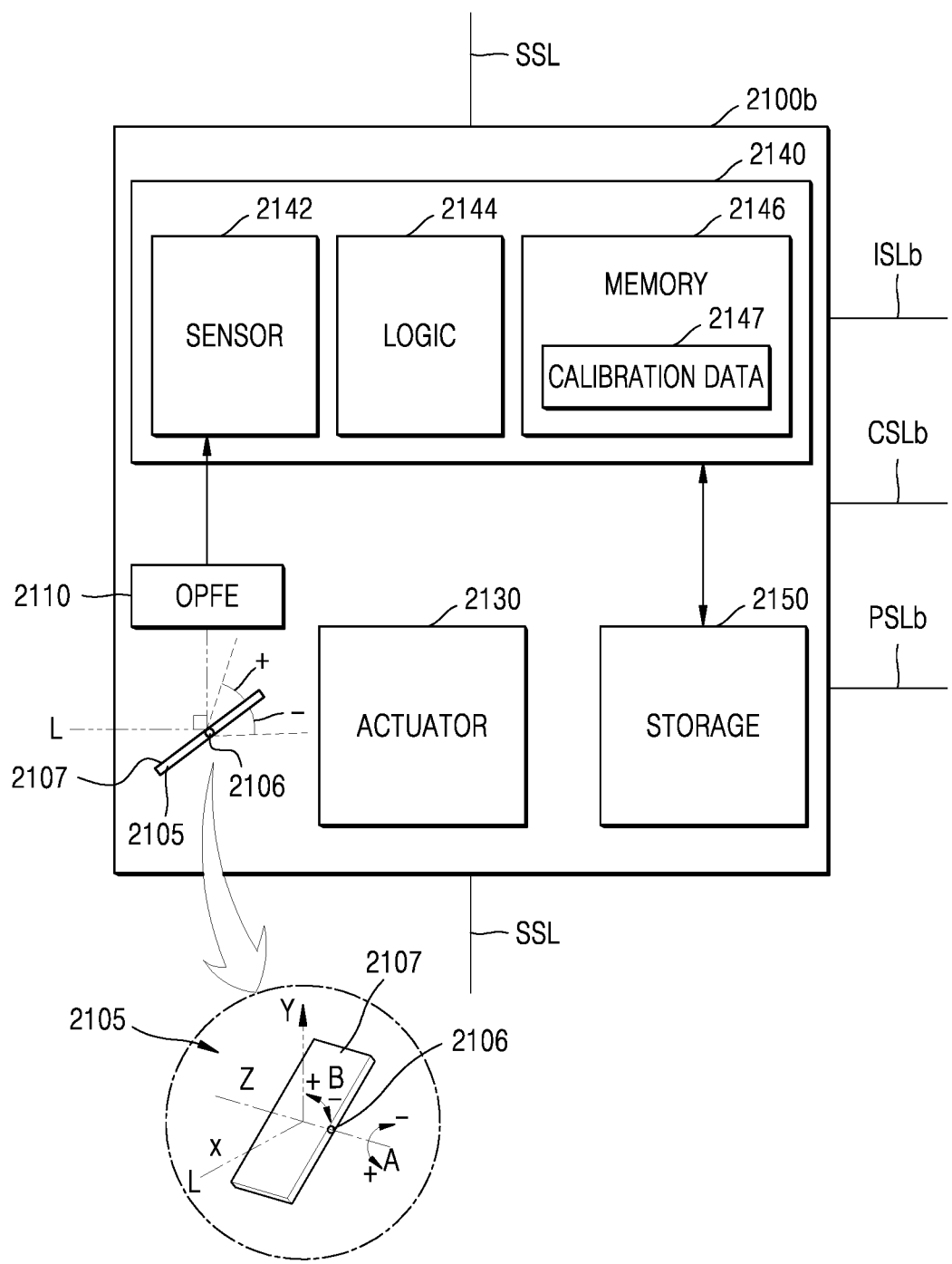
FIG. 15 is a block diagram showing a detailed configuration of a camera module according to an embodiment of the present disclosure.

FIG. 14 is a block diagram illustrating a part of an electronic device according to an embodiment of the present disclosure. FIG. 15 is a block diagram showing a detailed configuration of a camera module according to an embodiment of the present disclosure. Specifically, FIG. 14 is a diagram illustrating the electronic device 2000 as a part of the electronic device 1000 of FIG. 13, and FIG. 15 is a diagram illustrating a specific configuration of the camera module 2100b of FIG. 14.

Referring to FIG. 14, the electronic device 2000 may include a multi-camera module 2100, an application processor 2200, and a memory 2300. Since the memory 2300 may perform the same function as the memory 1400 shown in FIG. 13, a redundant description will be omitted.

The electronic device 2000 may capture and/or store an image of an object by using a CMOS image sensor, and may be implemented as a mobile phone, a tablet computer, or a portable electronic device. The portable electronic device may include a laptop computer, a mobile phone, a smartphone, a tablet PC, a wearable device, etc.

The multi-camera module 2100 may include a first camera module 2100a, a second camera module 2100b, and a third camera module 2100c. The multi-camera module 2100 may include the image sensor 100 of FIG. 1. In FIG. 14 it is shown that the multi-camera module 2100 includes three camera modules 1100a to 1100c, but the present disclosure is not limited thereto, and various numbers of camera modules may be included in the multi-camera module 2100.

Hereinafter, a detailed configuration of the camera module 2100b will be described in more detail with reference to FIG. 15, but the following description may be equally applied to other camera modules 2100a and 2100c according to an embodiment.

Referring to FIG. 15, the camera module 2100b may include a prism 2105, an optical path folding element (OPFE) 2110, an actuator 2130, an image sensing device 2140, and a storage 2150. The prism 2105 may include a reflective surface 2107 of a light reflecting material to deform a path of light L incident from the outside.

According to an example embodiment, the prism 2105 may change the path of light L incident in the first direction X to the second direction Y perpendicular to the first direction X. In addition, the prism 2105 may rotate the reflective surface 2107 of the light reflecting material in an A direction or a B direction around a center axis 2106, thereby changing the path of the light L incident in the first direction X to the second direction Y perpendicular to the first direction X. At this time, the OPFE 2110 may also move in a third direction Z perpendicular to the first direction X and second direction Y.

In the example embodiment, the maximum rotatable angle of the prism 2105 in the direction A may be less than or equal to 15 degrees in the positive (+) A direction and may be greater than 15 degrees in the negative (−) A direction. However, embodiments are not limited thereto.

In an example embodiment, the prism 2105 may be rotated by around 20 degrees, between 10 degrees and 20 degrees, or between 15 degrees and 20 degrees in the positive (+) or negative (−) B direction. Here, the prism 2105 may be rotated by the same angle or similar angles that are different from each other by around 1 degree in the positive (+) B direction and the negative (−) B direction.

In an example embodiment, the prism 2105 may move the reflective surface 2107 of the light reflecting material in the third direction (e.g., a Z direction) parallel to the direction in which the center axis 2106 extends.

For example, the OPFE 2110 may include optical lenses including m (where m is a natural number) groups. m lenses may move in the second direction Y and change the optical zoom ratio of the camera module 2100b. For example, when the optical zoom ratio of the camera module 2100b is Z and the m optical lenses included in the OPFE 2110 are moved, the optical zoom ratio of the camera module 2100b may be changed to 3Z, 5Z, or an optical zoom ratio higher than 5Z.

The actuator 2130 may move the OPFE 2110 or optical lenses (hereinafter referred to as an optical lens) to a particular position. For example, the actuator 2130 may adjust the position of the optical lens, such that an image sensor 2142 is positioned at the focal length of the optical lens for accurate sensing.

The image sensing device 2140 may include the image sensor 2142, a control logic 2144, an encoder, and a memory 2146. The image sensor 2142 may sense an image of a sensing target using light L provided through an optical lens. Since the image sensor 2142 of FIG. 15 may be functionally similar to the image sensor 110 of FIG. 1, a redundant description will be omitted. The control logic 2144 may control the overall operation of the second camera module 2100*b*. For example, the control logic 2144 may control the operation of the second camera module 2100*b* according to a control signal provided through the control signal line CSLb.

The memory 2146 may store information necessary for the operation of the second camera module 2100*b*, e.g., calibration data 2147. The calibration data 2147 may include information necessary for the second camera module 2100*b* to generate image data by using the light L provided from the outside. The calibration data 2147 may include, for example, information about a degree of rotation described above, information about a focal length, information about an optical axis, etc. When the second camera module 2100*b* is implemented in the form of a multi-state camera in which the focal length is changed depending on the position of the optical lens, the calibration data 2147 may include focal distance values for respective positions (or states) of the optical lens and information related to auto focusing. The storage 2150 may store image data sensed through the image sensor 2142. The storage 2150 may be provided outside the image sensing device 2140 and may be stacked with a sensor chip constituting the image sensing device 2140. In an example embodiment, the storage 2150 may be implemented with an electrically erasable programmable read only memory (EEPROM), but embodiments are not limited thereto.

Referring to FIGS. 14 and 15 together, in an example embodiment, one camera module (e.g., first camera module 2100*a*) from among a plurality of camera modules 2100*a*, 2100*b*, and 2100*c* may include four sub-pixels that are adjacent to one another and share the same color information in one color pixel (e.g., a tetra cell), and another camera module (e.g., the second camera module 2100*b*) may include nine sub-pixels that are adjacent to one another and share the same color information in one color pixel (e.g., nona cell). However, embodiments are not limited thereto.

In an example embodiment, the camera modules 2100*a*, 2100*b*, and 2100*c* may each include an actuator 2130. Therefore, the camera modules 2100*a*, 2100*b*, and 2100*c* may include the same or different calibration data 2147 according to the operation of actuators 2130 included therein.

In an example embodiment, one camera module (e.g., the second camera module 2100*b*) from among the camera modules 2100*a*, 2100*b*, and 2100*c* may be a folded lens type camera module including the prism 2105 and the OPFE 2110 as described above, and the other camera modules (e.g., 2100*a* and 2100*c*) may be a vertical type camera module without the prism 2105 and the OPFE 2110. However, embodiments are not limited thereto.

In an example embodiment, one camera module (e.g., a third camera module 2100*c*) from among the camera modules 2100*a*, 2100*b*, and 2100*c* may be a vertical type depth camera that extracts depth information by using an infrared ray (IR), for example. In this case, the AP 2200 may generate a three-dimensional (3D) depth image by merging image data provided from such a depth camera with image data provided from another camera module (e.g., the first camera module 2100*a* or the second camera module 2100*b*).

In an example embodiment, at least two camera modules (e.g., first camera module 2100*a* and second camera module 2100*b*) from among the camera modules 2100*a*, 2100*b*, and 2100*c* may have different field of views (FOVs). In this case, for example, at least two camera modules (e.g., the first camera module 2100*a* and the second camera module 2100*b*) from among the camera modules 2100*a*, 2100*b*, and 2100*c* may have different optical lenses, but the present disclosure is not limited thereto. For example, the first camera module 2100*a* from among the camera modules 2100*a*, 2100*b*, and 2100*c* may have a smaller FOV than the second camera module 2100*b* and the third camera module 2100*c*. However, the present disclosure is not limited thereto, and the multi camera module 2100 may further include a camera module having a larger FOV than originally used camera modules 2100*a*, 2100*b*, and 2100*c*.

Furthermore, in some embodiments, the camera modules 2100*a*, 2100*b*, and 2100*c* may be different FOVs from one another. In this case, optical lenses included in the camera modules 2100*a*, 2100*b*, and 2100*c* may also be different from one another, but the present disclosure is not limited thereto.

In some embodiments, the camera modules 2100*a*, 2100*b*, and 2100*c* may be physically separated from one another. In other words, the camera modules 2100*a*, 2100*b*, and 2100*c* do not divide and use the sensing area of one image sensor 2142. Rather, an independent image sensor 2142 may be provided inside each of the camera modules 2100*a*, 2100*b*, and 2100*c*.

The AP 2200 may include a plurality of sub-processors 2210*a*, 2210*b*, and 2210*c*, an image generator 2220, a camera module controller 2230, a memory controller 2400, and an internal memory 2250. The AP 2200 may be implemented separately from the camera modules 2100*a*, 2100*b*, and 2100*c*. For example, the AP 2200 and the camera modules 2100*a*, 2100*b*, and 2100*c* may be implemented separately from each other as separate semiconductor chips. Image data generated by the camera module 2100*a*, 2100*b*, and 2100*c* may be respectively provided to corresponding sub-processors 2210*a*, 2210*b*, and 2210*c* through image signal lines ISLa, ISLb, and ISLc separated from one another. For example, image data generated from the first camera module 2100*a* may be provided to a first sub-processor 2210*a* through a first image signal line ISLa, image data generated from the second camera module 2100*b* may be provided to a second sub-processor 2210*b* through a second image signal line ISLb, and image data generated from the third camera module 2100*c* may be provided to a third sub-processor 2210*c* through a third image signal line ISLc. The transmission of image data may be performed by using a camera serial interface based on the MIPI, but embodiments are not limited thereto.

In an example embodiment, one sub-processor may be provided to correspond to a plurality of camera modules. For example, the first sub-processor 2210*a* and the third sub-processor 2210*c* may be integrally implemented as a single sub-processor instead of being implemented separate from each other, and image data provided from the first camera module 2100*a* and the third camera module 2100*c* may be selected by a selecting element (e.g., a multiplexer) and provided to an integrated sub-image processor.

The camera module controller 2230 may provide a control signal to each of the camera modules 2100*a*, 2100*b*, and 2100*c*. A control signal generated from the camera module controller 2230 may be provided to corresponding camera modules 2100*a*, 2100*b*, and 2100*c* through control signal lines CSLa, CSLb, and CSLc separated from one another. A synch signal line SSL may be provided between the camera modules 2100*a*, 2100*b*, and 2100*c*.

While the present disclosure has been particularly shown and described with reference to embodiments thereof, it will be understood that various changes in form and details may be made thereto without departing from the spirit and scope of the present disclosure set forth by the following claims.

What is claimed is:

1. An image sensor comprising a pixel array in which a plurality of pixels are arranged and a readout circuit,
   wherein at least one of the plurality of pixels comprises:
   a first photodiode;
   a second photodiode having a larger light-receiving area than the first photodiode;
   a first floating diffusion node in which charges generated by the first photodiode accumulate;
   a second floating diffusion node in which charges generated by the second photodiode accumulate;
   a first capacitor configured to accumulate charges that overflow from the first photodiode;
   a first switch transistor having a first end connected to the first floating diffusion node and a second end connected to the first capacitor, and
   a driving transistor configured to convert the charges accumulated in the first floating diffusion node and the second floating diffusion node into a pixel signal,
   wherein the first switch transistor is turned on in a first section operating in a low conversion gain (LCG) mode of a readout section of the first photodiode, and
   is turned off in a second section operating in a high conversion gain (HCG) mode of the readout section of the first photodiode, and
   wherein the readout circuit generates image data based on first pixel signals read out from the first section and second pixel signals read out from the second section.

2. The image sensor of claim 1, wherein the first pixel signals correspond to a first luminance range,
   wherein the second pixel signals correspond to a second luminance range that is at least partially equal to or less than the first luminance range.

3. The image sensor of claim 1, wherein the at least one pixel comprises:
   a reset transistor having a first end connected to the first floating diffusion node and a second end to which a reset voltage is applied; and
   a first transmission transistor having a first end connected to the first photodiode and a second end connected to the first floating diffusion node.

4. The image sensor of claim 3, wherein the image sensor outputs a voltage corresponding to an amount of the charges overflowed from the first photodiode and accumulated in the first capacitor, as a first image signal, in the first section,
   turns on the reset transistor after outputting the first image signal to reset the first capacitor and the first floating diffusion node, and
   turns off the reset transistor after the reset, and outputs a voltage corresponding to an amount of charges accumulated in the first capacitor after the first capacitor has been reset as a first reset signal.

5. The image sensor of claim 4, wherein the image sensor turns off the first switch transistor after outputting the first reset signal,
   outputs a voltage corresponding to the first floating diffusion node that has been reset as a second reset signal in the second section, and
   turns on the first transmission transistor after outputting the reset signal, accumulates charges generated by the first photodiode in the first floating diffusion node, and outputs a voltage corresponding to the accumulated charge amount in the first floating diffusion node as a second image signal.

6. The image sensor of claim 3, wherein at least one of the plurality of pixels comprises:
   a second transmission transistor having a first end connected to the second photodiode and a second end connected to the second floating diffusion node; and
   a conversion gain transistor having a first end connected to the first floating diffusion node and a second end connected to the second floating diffusion node.

7. The image sensor of claim 6, wherein the conversion gain transistor is turned on in a third section operating in the low conversion gain (LCG) mode of a readout section of the second photodiode, and
   is turned off in a fourth section operating in the high conversion gain (HCG) mode of the readout section of the second photodiode,
   wherein the readout circuit generates image data based on third pixel signals read out from the third section and fourth pixel signals read out from the fourth section.

8. The image sensor of claim 7, wherein the first pixel signals correspond to a first luminance range,
   wherein the second pixel signals correspond to a second luminance range that is at least partially equal to or less than the first luminance range,
   wherein the third pixel signals correspond to a third luminance range that is at least partially equal to or less than the second luminance range,
   wherein the fourth pixel signals correspond to a fourth luminance range that is at least partially equal to or less than the third luminance range.

9. The image sensor of claim 1, wherein at least one of the plurality of pixels comprises:
   a second switch transistor having a first end connected to a node in which the first switch transistor and the first capacitor are connected to each other; and
   a second capacitor connected to a second end of the second switch transistor.

10. The image sensor of claim 9, wherein the second switch transistor is turned on in a first section operating in the low conversion gain (LCG) mode of a readout section of the first photodiode, and
    is turned off in a second section operating in the high conversion gain (HCG) mode of the readout section of the first photodiode.

11. An image sensor comprising a pixel array in which a plurality of pixels are arranged and a readout circuit, wherein at least one of the plurality of pixels comprises:
    a first photodiode;
    a second photodiode having a larger light-receiving area than the first photodiode;
    a first transmission transistor configured to transmit charges generated by the first photodiode;
    a second transmission transistor configured to transmit charges generated by the second photodiode;
    a first floating diffusion node in which charges transmitted through the first transmission transistor accumulate;
    a second floating diffusion node in which charges transmitted through the second transmission transistor accumulate;
    a gain control transistor having a first end connected to the first floating diffusion node and a second end connected to the second floating diffusion node;
    a first capacitor configured to accumulate charges that overflow from the first photodiode;

a first switch transistor having a first end connected to the first floating diffusion node and a second end connected to the first capacitor;

a reset transistor having a first end connected to the first floating diffusion node and a second end to which a reset voltage is applied; and a driving transistor configured to convert charges accumulated in the first floating diffusion node and the second floating diffusion node into a pixel signal.

12. The image sensor of claim 11, wherein the first switch transistor is turned on in a first section operating in a low conversion gain (LCG) mode of a readout section of the first photodiode, and is turned off in a second section operating in a high conversion gain (HCG) mode of the readout section of the first photodiode.

13. The image sensor of claim 12, wherein the gain control transistor is turned on in a third section operating in the low conversion gain (LCG) mode of a readout section of the second photodiode, and is turned off in a fourth section operating in the high conversion gain (HCG) mode of the readout section of the second photodiode.

14. The image sensor of claim 13, wherein the readout circuit generates image data based on first pixel signals read out from the first section, second pixel signals read out from the second section, third pixel signals read out from the third section, and fourth pixel signals read out from the fourth section.

15. The image sensor of claim 14, wherein the first pixel signals correspond to a first luminance range, wherein the second pixel signals correspond to a second luminance range that is at least partially equal to or less than the first luminance range, wherein the third pixel signals correspond to a third luminance range that is at least partially equal to or less than the second luminance range, wherein the fourth pixel signals correspond to a fourth luminance range that is at least partially equal to or less than the third luminance range.

16. The image sensor of claim 11, wherein at least one of the plurality of pixels comprises:

a second switch transistor having a first end connected to a node in which the first switch transistor and the first capacitor are connected to each other; and a second capacitor connected to a second end of the second switch transistor.

17. The image sensor of claim 16, wherein the second switch transistor is turned on in a first section operating in a low conversion gain (LCG) mode of a readout section of the first photodiode, and is turned off in a second section operating in a high conversion gain (HCG) mode of the readout section of the first photodiode.

18. An image sensor comprising a pixel array in which a plurality of pixels are arranged and a readout circuit, wherein at least one of the plurality of pixels comprises:

a first photodiode;

a second photodiode having a larger light-receiving area than the first photodiode;

a first floating diffusion node in which charges generated by the first photodiode accumulate;

a first capacitor configured to accumulate charges that overflow from the first photodiode;

a first switch transistor having a first end connected to the first floating diffusion node and a second end connected to the first capacitor;

a second switch transistor connected to the first floating diffusion node;

a second floating diffusion node in which charges transmitted through the switch transistor accumulate; and a driving transistor configured to convert the charges accumulated in the second floating diffusion node into a pixel signal.

19. The image sensor of claim 18, wherein the first switch transistor is turned on in a first section operating in a low conversion gain (LCG) mode of a readout section of the first photodiode, and is turned off in a second section operating in a high conversion gain (HCG) mode of the readout section of the first photodiode.

20. The image sensor of claim 18, wherein the second switch transistor is turned on in the readout section of the first photodiode, and is turned off in a readout section of the second photodiode.

* * * * *